US008714434B2

United States Patent
Cho et al.

(10) Patent No.: US 8,714,434 B2
(45) Date of Patent: May 6, 2014

(54) WEIGHT BALANCER AND PIPE JOINING METHOD

(75) Inventors: Ki-Soo Cho, Daejeon (KR); Young-jun Park, Daejeon (KR); Sun-kyu Park, Daejeon (KR); Seong-youb Chung, Gwangju (KR); Hong-rae Chang, Daejeon (KR); Young-youl Ha, Daejeon (KR); Sung-joon Kim, Mokpo (KR); Jong-il Park, Suwon (KR)

(73) Assignee: Samsung Heavy Ind. Co., Ltd. (KR)

( * ) Notice: Subject to any disclaimer, the term of this patent is extended or adjusted under 35 U.S.C. 154(b) by 1097 days.

(21) Appl. No.: 12/224,271

(22) PCT Filed: Feb. 23, 2007

(86) PCT No.: PCT/KR2007/000955
§ 371 (c)(1),
(2), (4) Date: Aug. 22, 2008

(87) PCT Pub. No.: WO2007/097589
PCT Pub. Date: Aug. 30, 2007

(65) Prior Publication Data
US 2009/0014500 A1   Jan. 15, 2009

(30) Foreign Application Priority Data

Feb. 23, 2006  (KR) ..................... 10-2006-0017832
Dec. 11, 2006  (KR) ..................... 10-2006-0125443

(51) Int. Cl.
*B23K 20/00* (2006.01)
(52) U.S. Cl.
USPC ........................................ 228/102; 29/407.09
(58) Field of Classification Search
USPC .................... 29/407.09; 228/102, 12; 73/1.75
See application file for complete search history.

(56) References Cited

U.S. PATENT DOCUMENTS

| 3,658,286 A | 4/1972 | Terai et al. |
| 3,658,288 A | 4/1972 | Mazza |
| 8,104,752 B2 * | 1/2012 | Eidelberg ..................... 269/60 |
| 2005/0004689 A1 * | 1/2005 | Shih et al. .................... 700/63 |
| 2005/0280314 A1 * | 12/2005 | Jeanne et al. ................ 310/10 |

FOREIGN PATENT DOCUMENTS

| EP | 1 413 391 | 4/2004 |
| JP | 61-33793 | 2/1986 |
| JP | 61033793 A | 2/1986 |

(Continued)

*Primary Examiner* — David Bryant
*Assistant Examiner* — Moshe Wilensky
(74) *Attorney, Agent, or Firm* — Harness, Dickey & Pierce, P.L.C.

(57) ABSTRACT

The present invention relates to a weight balancer (100) and a pipe joining method that is capable of reducing a load of pipes when arranging and welding the pipes in ships, plants, piping work sites and the like. A weight balancer (100) according to the present invention includes an operation plate (180) for putting an alignment object; a plurality of load cells (145,146) installed in the lower portion of the operation plate (180); a controller (120) which receives a detection signal generated from the load cell (145,146) and analyzes the information of the alignment object to generate a control signal; an operation force driver (130) which receives the control signal from the controller (120) to control an operational pressure of each of a plurality of pressure supply lines; and a plurality of leveling cylinders (150) and balancing devices (160) which are connected to the pressure supply lines to control a location or pose of the operation plate (180) so as to correspond to the size of the operational pressure controlled by the operation force driver (130).

6 Claims, 13 Drawing Sheets

(56) References Cited

FOREIGN PATENT DOCUMENTS

| JP | 62-54598 | 3/1987 |
|---|---|---|
| JP | 62054598 A | 3/1987 |
| JP | H6-199498 | 7/1994 |
| JP | 2006-213552 | 8/2006 |
| SU | 1673357 A2 | 8/1991 |

* cited by examiner

WEIGHT BALANCER AND PIPE JOINING METHOD

TECHNICAL FIELD

The present invention relates to a weight balancer and a pipe joining method; and, more particularly, to a weight balancer and a pipe joining method that is capable of reducing a load of pipes when arranging and welding the pipes in ships, plants, piping work sites and the like.

BACKGROUND ART

There are many light or heavy pipes in ships, plants, piping work sites and the like. That is, pipes through which various fluids, gases, electrical connections or the like might pass are installed as complicatedly as cobwebs.

In reality, since such pipes are limited in length, a welding operator welds a plurality of pipes to one another to make the pipe in a desired length.

Particularly, even a single pipe used in main pipe lines and the heavy weight pipes are interconnected to be made into relatively long pipes while being suitable for a pipe line or plumbing design.

Herein, a reference pipe (hereinafter, referred to as 'first pipe') and a pipe (hereinafter, referred to as 'second pipe') corresponding to an object to be aligned and which is to be butt-welded to the first pipe, are required to be aligned before a butt weld.

A user performs a leveling operation by manually adjusting the direction, location and height of the second pipe by use of a wire or belt of a crane, thereby making the first pipe and the second pipe aligned.

The user puts the first pipe in a table like a surface plate, and puts the second pipe in a simple jig like a Y block placed in a location opposite to the surface plate. The simple jig supports the second pipe in the lower portion of the second pipe and acts to fix the second pipe by the self weight of the second pipe and the Y block.

The user moves the second pipe little by little in all directions of motion forward, backward, left, right, upward, downward and the like after lifting the second pipe slightly with the wire of the crane, or adjusts the height and direction of the simple jig in accordance with the movement, thereby aligning the second pipe to the first pipe.

However, the manual pipe aligning operation like this is very difficult when the second pipe is long in length and heavy in load, and includes a disadvantage in that an operation time for aligning and welding the pipes takes long depending on the height, angle, location, vibration and the like of the pipe even if the operator is a skilled one, especially when there is an imbalance state such that the center of gravity is eccentric from the center of volume according to the shape of the second pipe.

Further, the welding operation of the pipe cannot be performed quickly because of the difficulty to perform the manual pipe aligning operation in a precise manner. For example, during the welding operation for welding the first and the second pipe, an operator is typically required to go inside of the pipe to tack-weld the joining portion, and then welds the pipe from outside in a regular manner.

Accordingly, there is required a weight balancer that can improve weld quality by precisely adjusting the height, location, inclination, vibration of the pipe, as 6 degrees of freedom is given to a double plate type of operation plate supporting the pipe.

Further, generally, a plurality of pipes is required to be aligned for being interconnected before the butt weld. The combining operation before the butt weld of the two pipes according to the prior art is as follows. The combining operation is that the gap and stepped difference between the preset pipes are made to meet with a specific tolerance so as to weld the pipes by, e.g., TIG. Here, roundness correction should be made for the two pipes to be fitted consistently to each other.

Herein, a true circle refers to a circle of which the diameter or radius measured along the circumference is fixed. In regards to a pipe, the true circle further refers to a circle where the roundness corresponding to the difference between the maximum inside diameter and the minimum inside diameter is set within a tolerance.

In the pipe joining method of the prior art, the operator puts all the pipes on the surface plate and uniformly maintains their gaps to be in contact with one another by using the wire or the belt, and then a tack weld is performed by joining a first tab piece to one side of the external diameter of the pipe. Then, the operator inserts a power jack into the pipe and makes the stepped difference fitted while correcting the true circle of the pipe in use of the power jack repeatedly, and then the tack weld is performed to join a second tab piece to the opposite side of the pipe having the first tab piece attached thereto which was joined first. After then, the operator continuously tack-welds in order to join a third tab piece to a location corresponding to a 90° direction of the second tab piece of the pipe, followed by an operation of joining a fourth tab piece to an opposite side of the pipe having the third tab piece attached thereto. Then, the operator corrects the gap of the pipe by moving a spatula chisel in the circumference of the pipe after inserting the spatula chisel into the gap between the two pipes. Finally, the operator further joins other tab pieces between the first and the second tab piece, between the second and the third tab piece, between the third and the fourth tab piece and between the fourth and the first tab piece by tack-welding. Here, the number of other tab pieces is determined by diameters of pipes.

However, the pipe joining operation according to the prior art includes a problem in that the operation time does not only consume a lot of time as it is progressed manually, but the deviation of the weld quality is also very inconsistent depending on the proficiency of the operator. Thus, there is a disadvantage in that, when the pipe joining operation is not performed in a smooth manner, it affects the subsequent welding operation for the pipe at later.

Further, the pipe joining operation according to the prior art is more difficult when the pipe is large. That is, one large pipe is put on the surface plate, and in order to connect to the large pipe after that, another large pipe is put on a plurality of jigs having the same height as the level of the surface plate in use of the crane. After then, the operator corrects the gap by inserting the wire between the two large pipes while manipulating the crane, adjusting the height of the jig or moving them left and right, and meets the stepped difference by temporarily installing a level on the top thereof, and then, the tab pieces are fixed from the top by the tack weld method. After then, the tab piece is tack welded thereunder after correcting the stepped difference and the true circle by inserting a power jack into the pipe. After then, the remaining tab pieces are welded around the circumference of the pipe.

However, the pipe joining operation according to the prior art includes an inconvenience in that the large pipe should be moved in use of the transport device like a separate crane for correcting the roundness because the large pipe includes an excessive weight, e.g., about 600 kg, and a length, e.g., about 6 m, and includes a disadvantage in that the operation time of aligning and welding the pipes takes long due to the height, angle, location, vibration and the like of the pipe even though the operator is highly skilled because there is an imbalance state such that the center of gravity is eccentric from the center of volume in accordance with the shape of the pipe, e.g., bent pipe, elbow, T-pipe and the like.

Further, in order to prevent oxidization and nitrification in the welding process, expensive argon (Ar) gas is injected into all the space within the pipe, and the injected argon gas is discharged to the air through an opening portion of both side ends of the pipe, thus there is a problem in that a gas pursing cost is increased.

In order to solve the above, the present applicant has proposed an automatic pipe aligning device and a pipe aligning method, as disclosed in Korea Patent No. 639607 (referred to as 'Patent Reference 1').

However, there has been found a difficulty with regards to the automatic pipe aligning device of the Patent Reference 1 in aligning pipes while overcoming the weight of a fitting portion of one pipe to be aligned to another pipe.

For example, in case that the weight and length of the pipe corresponding to the fitting portion is about 600 kg and 6 m, there occurs a case that the six degrees of freedom motion is not realized because a six axis parallel robot like stewart-gough platform installed within the automatic pipe aligning device cannot support the weight of the fitting portion, thereby failing to align or fit the pipes. Herein, the six degrees of freedom motion includes a three-axis translational motion and a three-axis rotational motion. Here, the three-axis translational motion includes forward and backward motion (Surge) of X-axis direction; left and right motion (Sway) of Y-axis direction; up and down motion (Heave) of Z-axis direction, and the three-axis rotational motion includes rolling (ro) in which it rotates on the basis of X-axis direction; pitching (pi) in which it rotates on the basis of Y-axis direction; and yawing (ya) in which it rotates on the basis of Z-axis direction.

Further, in order to align a small fitting portion, the six axis parallel robot can move the fitting portion to the pipe, but friction occurs between the upper portion of the weight balancer and the fitting portion. Thus, an excessive load might be given to the fitting portion and the automatic pipe aligning device, there might occur damages such as scratch and the like in the fitting portion, and the clamping location of the automatic pipe aligning device and the fitting portion might be changed.

Further, the automatic pipe aligning device of the prior art does not consider a co-operative operation with a separate weight balancer, but only proposes the automatic pipe aligning method by the automatic pipe aligning device, thus in fact there occurs much difficulty in automatically aligning pipes because there was no mention for the method of joining them together with the weight balancer.

For example, the automatic pipe aligning method of the prior art includes a disadvantage in that the clamping location is unstable and the precision of correcting the true circle or of aligning the pipe and the fitting portion is relatively low because no action is disclosed for balancing the device right before clamping.

Particularly, the weight balancer mentioned in the description of the automatic pipe aligning device of the prior art includes a simple structure. The fitting portion which is aligned to the pipe is mounted on the upper portion and the weight balancer moves on the ground to act to form a joint portion by putting the fitting portion into contact with the pipe.

However, in case that the weight balancer is used in the automatic pipe aligning device of the prior art, a load for the fitting portion which is a payload cannot be reduced actively, and cannot support the fitting portion while translationally moving or rotating to correspond to the 6 degrees of freedom. Further, the upper portion of the weight balancer supporting the fitting portion is fixed, thereby resulting in a problem that the friction is generated, as mentioned above, between the fitting portion and the upper portion of the weight balancer.

DISCLOSURE OF INVENTION

Technical Problem

It is, therefore, a primary object of the present invention to provide a weight balancer that is adaptive for improving weld quality by precisely adjusting the height, location, inclination and vibration of a pipe as 6 degrees of freedom is given to a double plate type of operation plate supporting the pipe while reducing the load of the pipe.

It is another object of the present invention to provide a weight balancer that is a daptive for rapidly performing a pipe aligning operation manually or by an automatic pipe aligning robot as a weight balancing operation is linked to a leveling operation of a corresponding cylinder in use of a plurality of load cells.

It is still another object of the present invention to provide a pipe joining method that is adaptive for controlling a weight balancer and an automatic pipe aligning device in conjunction therewith.

It is still another object of the present invention to provide a pipe joining method that is adaptive for maximizing an operational efficiency by automating a fitting operation before a pipe butt weld, as a weight balancer having functions of load decrease, 6 degrees of freedom support, translational motion, rotation and minute adjustment is made in conjunction with an automatic pipe aligning device which is installed in the internal wall of a pipe and can perform a fine aligning operation.

Technical Solution

In accordance with the present invention, there is provided a weight balancer, including: an operation plate for putting an alignment object; a plurality of load cells installed in the lower portion of the operation plate; a controller which receives a detection signal generated from the load cell and analyses the information of the alignment object to generate a control signal; an operation force driver which receives the control signal from the controller to control an operational pressure of each of a plurality of pressure supply lines; and a plurality of leveling cylinders and balancing devices which are connected to the pressure supply lines to control a location or pose of the operation plate so as to correspond to the size of the operational pressure controlled by the operation force driver.

In the weight balancer, the leveling cylinder and the balancing device are any one selected from an air spring of which the pressure can be adjusted, a linear motor being a linear transferring device of which the length can be adjusted, a hydraulic servo cylinder, a motor and a rack and pinion mechanism, and a ball screw.

In the weight balancer, a tilt sensor connected to the controller for inputting inclination information is stuck to the operation plate.

In the weight balancer, the leveling cylinder and the balancing device are each installed in a body frame, and in the lower portion of the body frame are provided a plurality of height adjustment shaft and a moving roller having a stopper unit.

In the weight balancer, the operation plate includes an upper plate and a lower plate between which a plurality of slide contact portions are arranged, and an edge beam is stuck to the bottom surface of the edge of the upper plate.

The weight balancer further includes a plurality of guide portions installed between the lower plate and the body frame, and each of the guide portion includes: a ball type pivot combined with the lower plate; a guide shaft which is extended along axial direction from a ball of the ball type pivot and includes an axial length relatively longer than a maximum stroke distance of the leveling cylinder and the balancing device; and a guide bush installed in an upper plate of the body frame to be combined with the guide shaft by a slide insertion method.

In the weight balancer, a plurality of gap maintaining shafts for keeping distance from the lower plate are further installed in the edge beam.

In the weight balancer, the upper plate includes a plurality of groove type mounting holes to arrange a plurality of roller jigs which are detachable and support an alignment object, and the groove type mounting hole includes a disposition gap and orientation corresponding to each shape of a plurality of pipe layouts inclusive of at least a straight pipe, an elbow pipe and a T-type pipe.

In accordance with the present invention, there is provided a pipe joining method in which a first pipe and a second pipe are disposed in a surface plate and a weight balancer respectively and an automatic pipe aligning device is inserted into the first pipe to be set, the pipe joining method including: sensing to confirm an operation location to stop after driving the automatic pipe aligning device; extending a true circle correcting device for keeping the automatic pipe aligning device to be level; correcting the true circle of each of the first and second pipes; first measuring a joint shape formed between the first and second pipes for alignment; aligning the second pipe to the first pipe to correspond to the first measurement result; second measuring the joint shape for confirming what is aligned; and having the automatic pipe aligning device seal up and inject gas for welding when the result value of the second measurement is included in a pre-set tolerance.

The pipe joining method further includes moving the gap adjusting device forward so that an internal pressure member of a front true circle correction device can be disposed inside the second pipe before correcting the true circles of the first and second pipes.

The pipe joining method further includes a detail alignment step for aligning the first and second pipes so that the gap and stepped difference of the first and second pipes can be welded in the step of aligning the pipes, wherein the detail alignment step includes the steps of: moving the second pipe in an X-axis direction to be separated from the first pipe; rotating the second pipe to correspond to a rotation component value for being converted into a goal pose; moving the second pipe to correspond to movement values of Z axis and Y axis directions for the goal pose; and finally adjusting an offset in the X axis direction.

In the pipe joining method, the weight balancer receives a feedback of a load and inclination information sensed in the weight balancer and receives an operation information of the automatic pipe aligning device transmitted through an integral controller, and then, those information is used as a conditional value required for calculating an operation control value of the balancing cylinder and leveling cylinder of the weight balancer, thus the weight balancer is linked with the automatic pipe aligning device.

In the pipe joining method, in case that the result value of the second measurement is not included in a tolerance, the step of checking whether or not the result of the second measurement is included in the tolerance is repeatedly performed after performing the second pipe alignment step again.

In the pipe joining method, a laser beam is used in the step of confirming the operation location.

Advantageous Effects

The pipe joining method of the present invention proposes a specific method of precisely aligning the over-weighted fitting portion to the pipe, thereby enabling to remove the alignment error.

Further, the pipe joining method of the present invention does not generate the malfunction caused by the cross-interference between the pipe and the fitting portion, thus the pipe alignment quality can be maximized and the weld quality can be improved.

Further, the pipe joining method of the present invention adopts the integral controller and links the weight balancer with the automatic pipe aligning device, thus the fitting portion and the pipe can be arranged rapidly in a state that the static or dynamic load, the inclination, the vibration, and the weight or weight imbalance are reduced.

BRIEF DESCRIPTION OF THE DRAWINGS

The above and other objects and features of the present invention will become apparent from the following description of preferred embodiments, given in conjunction with the accompanying drawings, in which.

BEST MODE FOR CARRYING OUT THE INVENTION (Weight Balancer)

Preferred embodiments of the present invention will be described in detail with reference to the accompanying drawings.

Figure 1:
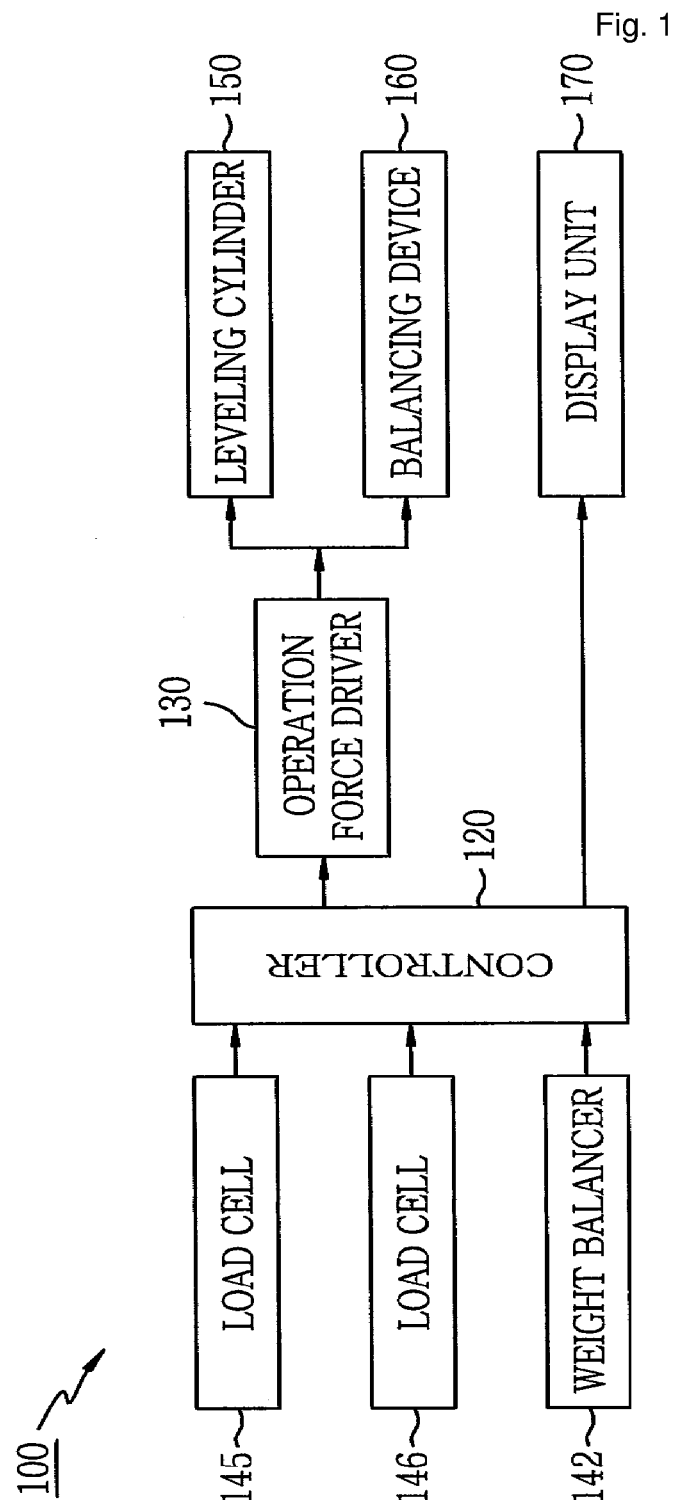
FIG. 1 is a block diagram illustrating an electrical configuration of a weight balancer according to an embodiment of the present invention.
Figure 2:
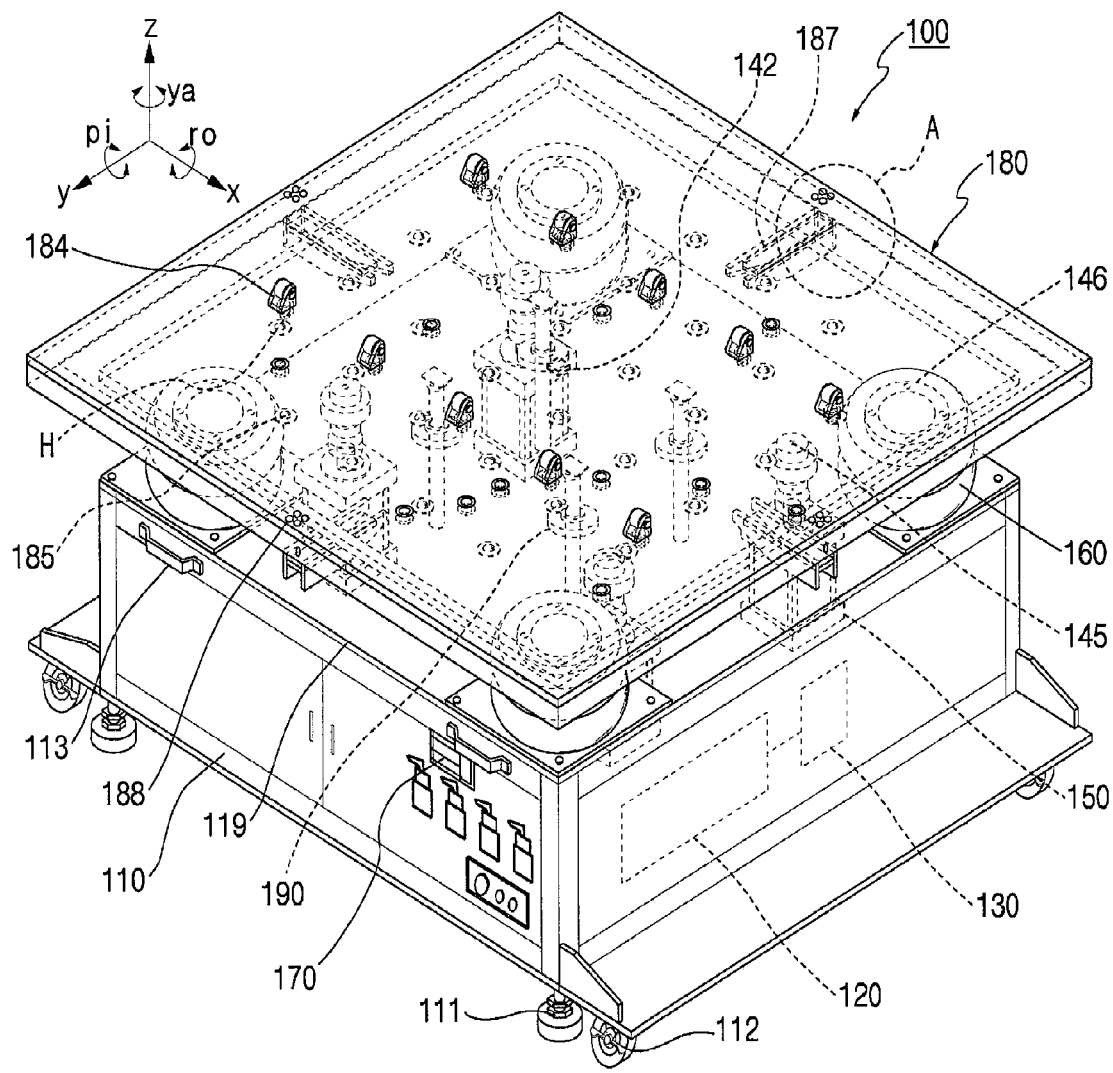
FIG. 2 is a perspective plan view illustrating a mechanical configuration of the weight balancer shown in FIG. 1.

As shown in FIGS. 1 and 2, a weight balancer according to an embodiment of the present invention includes a controller 120 and an operation force driver 130 within a body frame 110 of a box shape.

The controller 120 includes a power supply circuit which is connected to an external power source or a self power source, e.g., storage battery, and which can generate operational power that can be used in various sensors, the operation force driver 130, a leveling and balancing operation process module, an input/output circuit composition and the like.

The leveling and balancing operation process module of the controller 120 analyzes a static load, e.g., a single load transmitted in up and down directions, or a dynamic load, e.g., a plural load transmitted complexly, by a translational motion (surge, sway, heave) and a rotational motion (roll, pitch, yaw) inputted to an operation plate 180 in use of detection signals of various sensors, e.g., tilt sensor 142, or load cells 145, 146 inputted through a sensor interface, and then, serves to transmit a cylinder control signal such as a stroke control signal which reduces or controls the static or dynamic load, inclination and vibration to the operation process module 130.

The load cells 145, 146 detect the load of the pipe and the like, and act to transmit a detection signal converted into an electrical signal to the controller 120.

The leveling and balancing operation process module of the controller 120 can be at least one general automatic regulator or an equivalent thereof, but the kind thereof is not limited thereto.

The controller 120 includes the operation force driver 130; the leveling and balancing operation process module having a configuration like a computer which controls a plurality, e.g., 8, of load cells 145, 146 and a display unit 170 correspondingly to an operational method described below; and the input circuit composition such as a sensor interface, a power switch, a plurality of operational switches, buttons and the like which are electrically connected to the controller 120.

The controller 120 includes a general output circuit composition for transmitting analog signals corresponding to an operational state of the weight balancer 100 to various operation lamps and a display device of a display unit 170.

The operation force driver 130 includes a connection line composition connected to be supplied with an operational pressure from an external operation source (not shown), e.g., air pressure pump, hydraulic pressure pump and the like; a drive circuit composition which adjusts the size or increase and decrease of the operational pressure while selectively and precisely controlling the open and close of a plurality, e.g., 8, of solenoid valves of which each is installed in a pressure supply line (not shown) of the connection line composition.

Herein, one side line of the pressure supply line is connected to each leveling cylinder 150 in one side port of the operation force driver 130, and the other side line of the pressure supply line is connected to each balancing device 160 in the other side port of the operation force driver 130.

The operation force driver 130 precisely controls the open and close of the solenoid valve of the pertinent pressure supply line correspondingly to the cylinder control signal of the controller 120, thus the operation force driver 130 acts to change an axial force of a plurality, e.g., 4, of balancing devices 160 and a plurality of, e.g., 4, of leveling cylinders 150 correspondingly to the size of the pertinent operational pressure, or to change the axial length of an extension and reduction direction.

In the description of the present invention, the pertinent leveling cylinder 150 and the balancing device 160 which takes the role of leveling or weight balancing might be understood as an actuator that linearly moves the operational axis by a piston within a cylinder casing supplied with the operational pressure by way of reducing the pipe load or generating the axial force of the same size as the pipe load in a direction opposite to the gravity direction, thus the sum of the pipe load and the cylinder load is made to be zero.

That is, the leveling cylinder 150 and the balancing device 160 is a pressure device that extends or reduces the axial length within a finite stroke distance by way of making the operational axis rise (for example, forward operation) or fall (for example, backward operation) in an axial direction within the finite stroke distance or moving a bellows tube in an up and down direction as it controls the operational pressure supplied from an external operation source, e.g., air pressure, hydraulic pressure, other fluid pressure, controlled by the controller 120.

Further, the leveling cylinder 150 and the balancing device 160 can be electrically configured such as a linear motor or a servo motor rotating a ball screw axis and a ball screw nut block combined by screws to the ball screw axis, can be configured to be an air pressure type such as a hydraulic pressure servo cylinder, and can be configured to perform the leveling and weight balancing of the operation plate 180 as the ball screw nut block rises and falls.

That is, in case of using the air pressure type configuration in the present embodiment, the leveling cylinder 150 and a plurality of balancing devices 160 are desirable to be any one selected from an air spring of which the pressure can be controlled, a linear motor being a linear transport device of which the length can be adjusted, a hydraulic pressure servo cylinder, a motor and a rack and pinion apparatus, and a ball screw.

Particularly, the balancing device 160 in the present invention controls the injection or discharge of air pressure, thus a tube type of restoration spring that can extend or reduce the bellows tube in the axial direction might be used.

The extension or reduction length of the operational axis of each of the leveling cylinder 150 and the balancing device 160 is desirable to be controlled by the stroke control signal of the controller 120 correspondingly to the size of the detection signal generated in the load cells 145, 146.

Further, a tilt sensor 142, a level or the like is desirable to be further attached to the center of the operation plate 180.

For example, in case of the tilt sensor 142, the detection signal, e.g., tilt information, generated and detected at the tilt sensor 142 is inputted to the controller 120 through the pertinent input wire and sensor interface.

Further, in the present invention, a hand slid valve, FRL, a pressure switch, a sound absorber, a manifold, a distributor, a filter, a silencer and the like are desirable to be further mounted between the external operation source, the leveling cylinder 150 and the balancing device 160, by use of the general pressure circuit configuration and combining technique.

Each of the load cells 145, 146 is installed in the operational axis of the balancing device 160 and the leveling cylinder 150 and inputs the electrical detection signal, e.g., a measured load, generated and detected correspondingly to the load applied to the operational axis of the balancing device 160 and the leveling cylinder 150, respectively, to the controller 120 through the pertinent input wire and sensor interface.

The display unit 170 acts to display the operational state of each of the operation force driver 130, the load cell 145, 146, the leveling cylinder 150 and the balancing device 160 correspondingly to the output signal inputted from the controller 120.

Referring to FIG. 2, the body frame 110 is desirable to further include a plurality of height control axes 111 which are located in the lower portion thereof and are of a screw type and of which the variable width is hundreds of mm; and a moving roller 112 having a stopper unit for freely moving the body frame 110.

Further, the body frame 110 is desirable to further form a plurality of handle bars 113 in the side thereof.

The operation plate 180 being a double plate type and acting to be a jig is installed on top of the body frame 110.

The operation plate 180 is supported by the leveling cylinder 150 and the balancing device 160 having the load cells 145, 146, respectively.

A plurality of guide portions 190 acts to guide the extension and reduction of the axis of the leveling cylinder 150 or the balancing device 160 according to the configuration and combination relation to be described in detail below.

Figure 3:
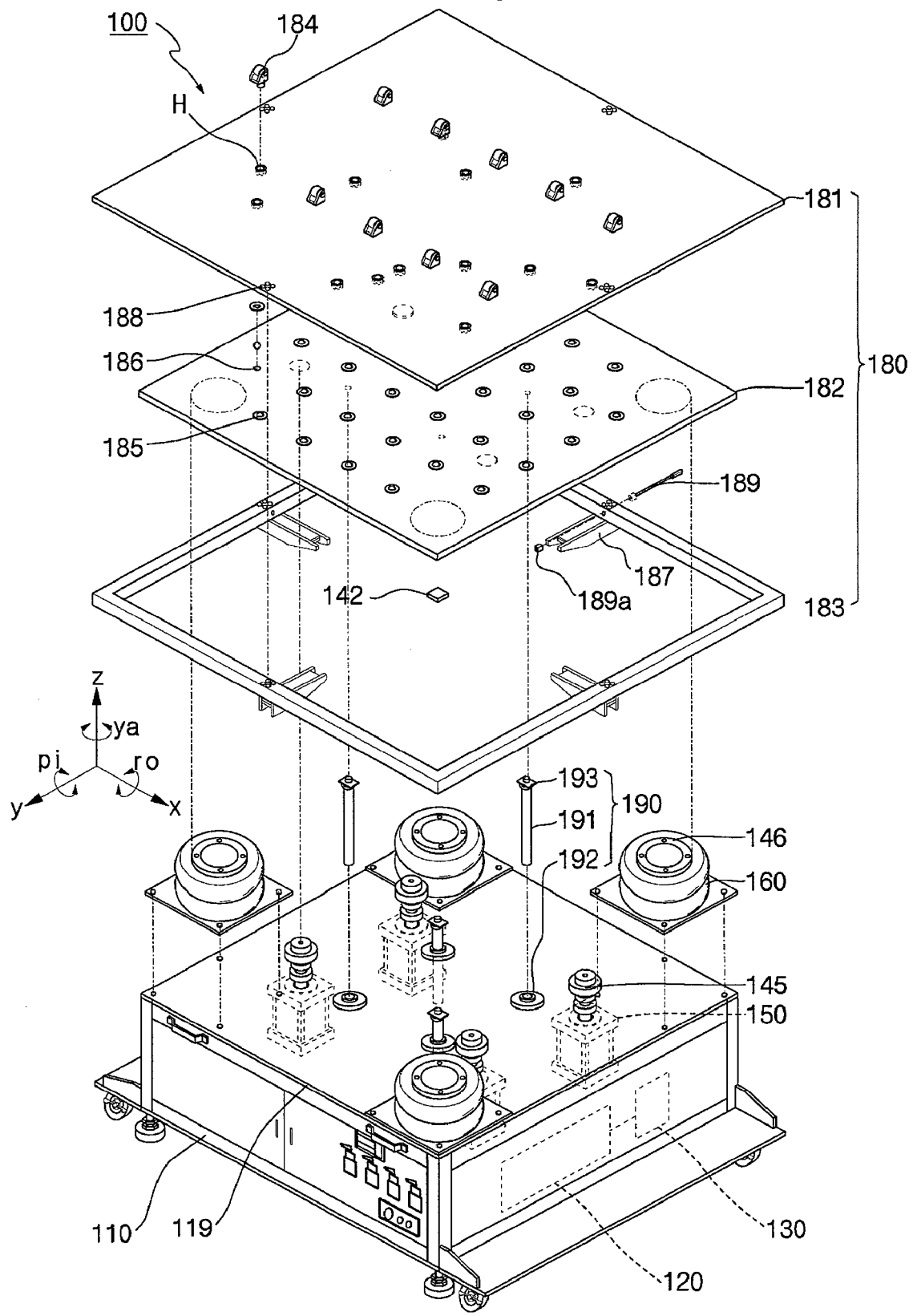
FIG. 3 is an exploded perspective plan view of the weight balancer shown in FIG. 2.

As shown in FIG. 3, the operation plate 180, as mentioned above, is a jig of a double plate type, and includes an upper plate 181, a lower plate 182 and an edge beam 183.

The upper plate 181 is a plate member of a surface plate type having a plane area equal or similar to that of the body frame 110.

The upper plate 181 is combined with a plurality of roller jigs 184 which supports correspondingly to the shape of the pertinent pipe among the pipes of various shapes (refer to the second pipe 13 of FIG. 6 corresponding to the object to be aligned) and which can rotate the pipes in the circumference direction of the pipe instead of making the pipe not to move in the axial direction or in a diameter direction by the self weight, shape and arrangement location of the pipe.

In order to combine the roller jig 184, in the upper surface of the upper plate 181 are formed a plurality of groove type mounting holes H which are of a bearing type so that the roller jig 184 can rotate on the basis of the axial direction of base bosses after the base bosses of the roller jig 184 are each inserted thereinto.

The groove type mounting holes H can be arranged on the upper surface of the upper plate 181 in any one arrangement type among a lattice type, a spiral type and a design type in accordance with the arrangement gap, direction and number thereof.

Figure 5:
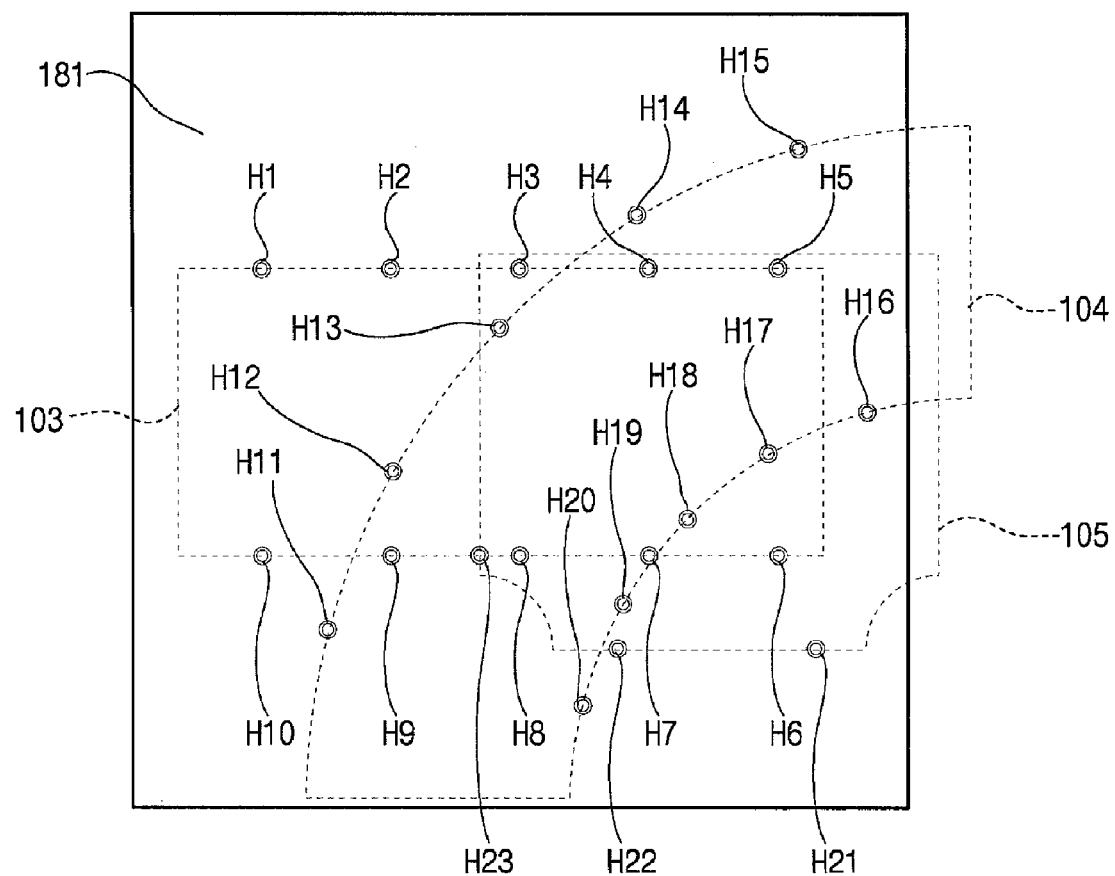
FIG. 5 is a plan view for explaining an operation plate of the weight balancer shown in FIG. 2.

For example, in case that the arrangement type is the design type, in the upper surface of the upper plate 181 can be arranged the groove type mounting holes H1-H10 of a first group for a straight type pipe layout 103, the groove type mounting holes H11-H20 of a second group for an elbow type pipe layout 104, and the groove type mounting holes H21-H23 of a third group for a T-type pipe layout 105, as shown in FIG. 5.

That is, the groove type mounting holes H1-H22 are desirable to include the disposition gap and orientation corresponding to the shape of each of the pipe layouts 103, 104, 105 inclusive of at least the straight type pipe, the elbow type pipe and the T-type pipe.

Referring to FIG. 3, in the lower portion of the upper plate 181 is located a lower plate 182 having a plane area smaller than that of the upper plate 181. In the upper surface of the lower plate 182 are arranged a plurality of slide contact portions 185 having arrangement types such as a lattice type, a spiral type and the like.

The slide contact portion 185 supports the upper plate 181 on the basis of the lower plate 182 and the upper plate 181 is allowed to freely move in a planar direction by the slide contact portion 185. To this extent, the slide contact portion 185 is a member which is in point or line contact with the bottom surface of the upper plate 181, and is desirable to be any one selected from a ball bearing, a thrust bearing, a caster and the like.

For example, in case of the ball bearing, in the upper surface of the lower plate 182 are formed a plurality of bearing placing grooves 186 in the same manner as the arrangement type of the slide contact portion 185, and fixing rings are combined around the bearing placing grooves 186 respectively. Thus, it is desirable to make the operation of the ball bearing stabilized in a state that the escape of the ball bearing is prevented by the fixing ring. For example, in relation to the combination of the fixing ring, in the inside edge thereof are formed external screw threads projected downward, and internal screw threads capable of being combined with the external screw threads are desirable to be formed in the inner circumference of the bearing placing grooves 186.

The edge beam 183 includes a shape of rectangular ring axis, includes a size so that the side and separation space of the lower plate 182 can be maintained, is relatively thicker than the lower plate 182, and is stuck to the edge bottom of the upper plate 181.

The edge beam 183 further includes a plurality of reinforcing beams 187, each of the heads thereof facing from the bottom surface of the center portion of four sides thereof towards the center of the operation plate 180. Herein, each reinforcing beam 187 is fixed to the bottom surface of the edge beam 183 by welding.

The combination relation between upper plate 181, the lower plate 182 and the edge beam 183 will be described below.

The lower plate 182 is disposed inside the edge beam 183 and the reinforcing beam 187 fixed to the edge beam 183 prevents the lower plate 182 from escaping downward.

The upper plate 181 is deposited on the upper surface of the edge beam 183 so that the side thereof can be in consistence with the side surface of the edge beam 183.

Thereafter, in a method of joining the upper plate 181 to the edge beam 183, a plurality of bolt holes 188 formed in the edge beam 183 and the side of the upper plate 181 and a fixing bolt which can be combined with the bolt hole 188 are used.

At this moment, the upper surface of the lower plate 182 having the slide contact portions 185 maintains to be parallel to the bottom surface of the upper plate 181 and the both surfaces are separated from separated from each other.

By the slide contact portion 185, the upper plate 181 can slide in a planar direction within a finite range along the X-Y planar direction through which the X-Y axis passes on the basis of the lower plate 182, i.e., it can move in the X-axis direction or Y-axis direction, and the upper plate 181 is configured to be in a freely rotatable state, for example, yawing, on the basis of Z-axis as a rotation reference axis.

Further, the upper plate 181 can receive a rising and falling force for leveling or weight balancing from the leveling cylinder 150 and the balancing device 160 under the combination relation with the lower plate 182. Thus, it can move in the Z-axis direction, or the rotation such as the rolling on the basis of the X-axis as the rotation reference axis or the pitching on the basis of the Y-axis as the rotation reference axis can be made.

Herein, the axial movement means that it moves along the pertinent X, Y or Z axis direction, and the rotation reference axis indicates a main axis of rotation.

On the other hand, the pipes need to move when the operator manually aligns the pipes. In relation to this, in the prior art, there are problems in that a simple jig such as a Y-block supporting the pipe should be made to move and the operation time takes long. And, for the separate translational motion and rotation except the simple weight balancing, there is a disadvantage in that a complicated motion such as a preset multi axis motion should be given to the pipes which are to be arranged with the help of a separate crane so as to enable the pipe aligning operation.

However, in the present invention, the upper plate 181 of the operation plate 180 and the alignment object (the second pipe 13 shown in FIG. 6) such as the pipe to be put thereon can make the X-axis movement, the Y-axis movement and the yawing with the help of the slide contact portion 185 within the pre-designed range below, and at the same time, they can make the Z-axis movement, the rolling and the pitching by the leveling cylinder 150 or the balancing device 160. At this moment, the lower plate 182 of the operation plate 180 can keep the balance by the guide portion 190 so that the lower plate 182 cannot make the X-axis movement, the Y-axis movement and the yawing on the basis of the body frame 110.

In the end, the weight balancer of the present invention includes a characteristic capable of being fully linked with the pipe alignment as well as the leveling and the weight balancing through the operation plate 180.

The pre-designed range can be understood as an operation area range defined in set measures such as the X-axis movement or the surge type translational motion, e.g., ±20 mm, the Y-axis movement or the sway type translational motion, e.g., ±20 mm, the Z-axis movement or the heave type translational motion, e.g., ±20 mm, the rolling angle, e.g., ±15°, the pitching angle, e.g., ±15°, and the yawing angle, e.g., ±15°, on the basis of the diameter, e.g., 600-800 mm, of the set pipe. But, the measure of the operation area range is only exemplary, but is not limited thereto.

Figure 4:
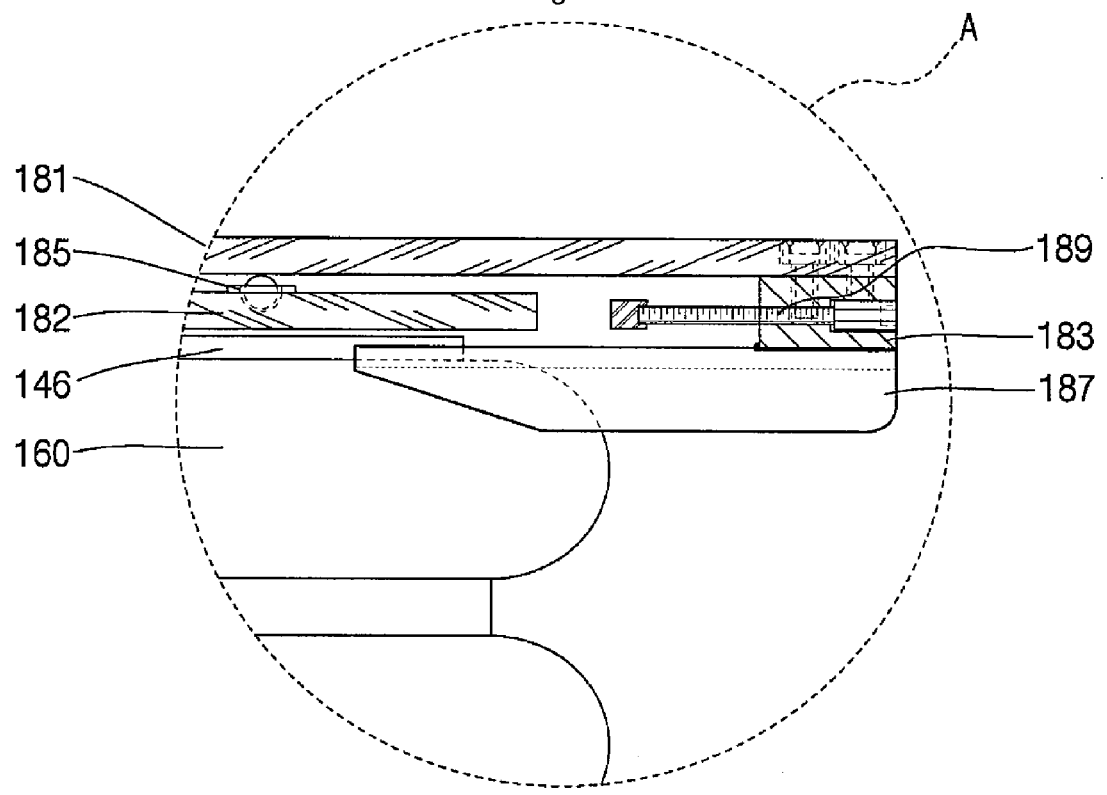
FIG. 4 is a magnified cross sectional view of the circle 'A' shown in FIG. 2.

As shown in the magnified circle 'A' of FIG. 4, a plurality of gap maintaining shafts 189, e.g., spacer, screw shaft and the like, are desired to be further installed in the edge beam 183 through an installation hole, e.g., screw hole, penetrating in a width direction of the edge beam 183.

To describe this in detail, the gap maintaining shaft 189 is combined with the installation hole penetrating the center portion of four sides of the edge beam 183, in use of screws. The gap maintaining shaft 189 can adjust the length projected from the inner surface of the edge beam 183 by means of the axial movement corresponding to the screw rotation thereof.

That is, the gap maintaining shaft 189 includes a hexagonal bolt type head portion and a screw body shaft. When a screw rotation is made by the operator in the installation hole, the gap maintaining shaft 189 moves forward to or backward from the lower plate 182. Further, an end block 189a is combined with the end of the screw body shaft of the gap maintaining shaft 189 on the basis of the opposite side to the hexagonal bolt type head portion.

A separation distance between the lower plate 182 and the end block 189a of the gap maintaining shaft 189 is adjusted in accordance with the shaft movement rate of the gap maintaining shaft 189. The end block 189a can be made of an elastic material for attenuating impact.

The gap maintaining shaft 189 acts to limit the movement or rotation of the aforementioned upper plate 181 within a set range, or to prevent the upper plate 181 from colliding with the lower plate 182 or the inner surface of the edge beam 183.

The operation plate 180 is functionally supported by the leveling cylinder 150 or the balancing device 160 as mentioned above.

A mechanical combination relation for this will be described in more detail.

Referring to FIG. 3 again, the plurality of guide portions 190 are combined on the basis of the plurality of combination reference portions located in the bottom surface of the lower plate 182 of the operation plate 180 and the plurality of load cells 145, 146 are arranged on the basis of the lower portion of the contact area located in the bottom surface of the lower plate 182.

For example, the guide portion 190 includes a guide shaft 191 and a guide bush 192. The guide bush 192 is installed in an upper plate 119 of the body frame 110, and the guide hole of the guide bush 192 is combined with the guide shaft 191 by a slide insertion method. A ball type pivot 193 is installed in the upper end of the guide shaft 191.

Herein, the guide shaft 191 is extended along the axis direction from the ball of the ball type pivot 193 to be described below. And, the guide shaft 191 is desirable to include a relatively longer axis than the maximum stroke distance of the leveling cylinder 150 and the balancing device 160.

The ball type pivot 193 includes a ball housing and a ball, the ball is protected to be able to freely move in the ball housing, and the end portion of the guide shaft 191 enters into the opening portion of the ball housing to be integrally connected to the spherical surface of the ball.

The ball housing is fixed to a fixing location of the lower plate 182, but the ball inside the ball housing can move freely in the space within the ball housing, thus the guide shaft 191 is made to rotate axially and to be inclined without a twist stress, and in the end, the rising and falling operation of the lower plate 182 is guided by the guide shaft 191 and the guide bush 192. Further, the inclination, e.g., pitching or rolling, of the whole operation plate 180 inclusive of the lower plate 182 can be performed on the basis of the ball type pivot 193.

That is, by the ball type pivot 193, the guide shaft 191 can perform the guide role together with the guide bush 192 while supporting the lower plate 182 of the operation plate 180 in the axis direction, and it enables the operation plate 180 to be inclined within the finite angle range.

On the other hand, the load cell 145, 146 can only support the lower plate 182 while being in contact therewith, but is not fixed thereto.

For example, the load cell 145 arranged in one side among the load cells 145, 146 is for the leveling cylinder 150 and is disposed in one side portion of the operation plate 180, to be in more detail, in the lower portion of the center contact area of the lower plate 182 of the operation plate 180, i.e., it is based on the center disposition. The cylinder casing of the leveling cylinder 150 is fixed to keep the set arrangement gap in the center portion such as one portion of the upper plate 119 of the body frame 110, on the basis of the center disposition. At this moment, the cylinder casing of the leveling cylinder 150 is located inside the body frame 110. On the contrary, each operational axis of the leveling cylinder 150 passes through the operational axis bushing of the upper plate 119 of the body frame 110, thus the operational axis is projected to the upper portion of the upper plate 119 to be combined with the load cell 145.

Particularly, the arrangement gap of the X-axis direction is desirable to be relatively higher than the arrangement gap of the Y-axis direction in consideration of the axis direction of the pipe when the leveling cylinder 150 is plural, e.g., 4, and keeps a fixed arrangement gap on the basis of the center of the upper plate 119 of the body frame 110.

The leveling cylinder 150 might act to make the height of the second pipe 13 corresponding to the alignment object reach the target value by way of adjusting the location of the operation plate 180 to correspond to the size of the operational pressure supplied from the operation force driver.

On the other hand, the load cell 146 arranged the other side among the load cells 145, 146 is for the balancing device 160, and is disposed in the other side portion of the operation plate 180, to be in more detail, in the lower portion of the corner side contact area of the lower plate 182 of the operation plate 180, i.e., is based on the corner disposition. Each load cell 146 is combined with the operational axis of the balancing device 160 on the basis of the corner disposition. And at this moment, the cylinder casing of the balancing device 160 is fixed and supported in the corner portion as in the other side portion of the upper plate 119 of the body frame 110.

The balancing device 160 can act to prevent the inclination and vibration of the operation plate 180 correspondingly to the size of the operational pressure supplied from the operation force driver.

At this moment, as described above, due to the combination relational characteristic between the operation plate 180 having the upper plate 181, the lower plate 182, the edge beam 183, the slide contact portion 185 and the reinforcing beam 187 and the ball type pivot 193 of the guide portion 190, or the combination relational characteristic between the operation plate 180 and the load cell 145, 146, the 6 degrees of freedom can be obtained within the finite range.

That is, the operation plate 180 having the 6 degrees of freedom of this embodiment includes a movement corresponding to the translational motion and rotation sensitively and performs the role of the jig which performs the leveling and weight balancing by the leveling cylinder 150 and the balancing device 160, thus more precise and rapid leveling and weight balancing can be performed.

Figure 6:
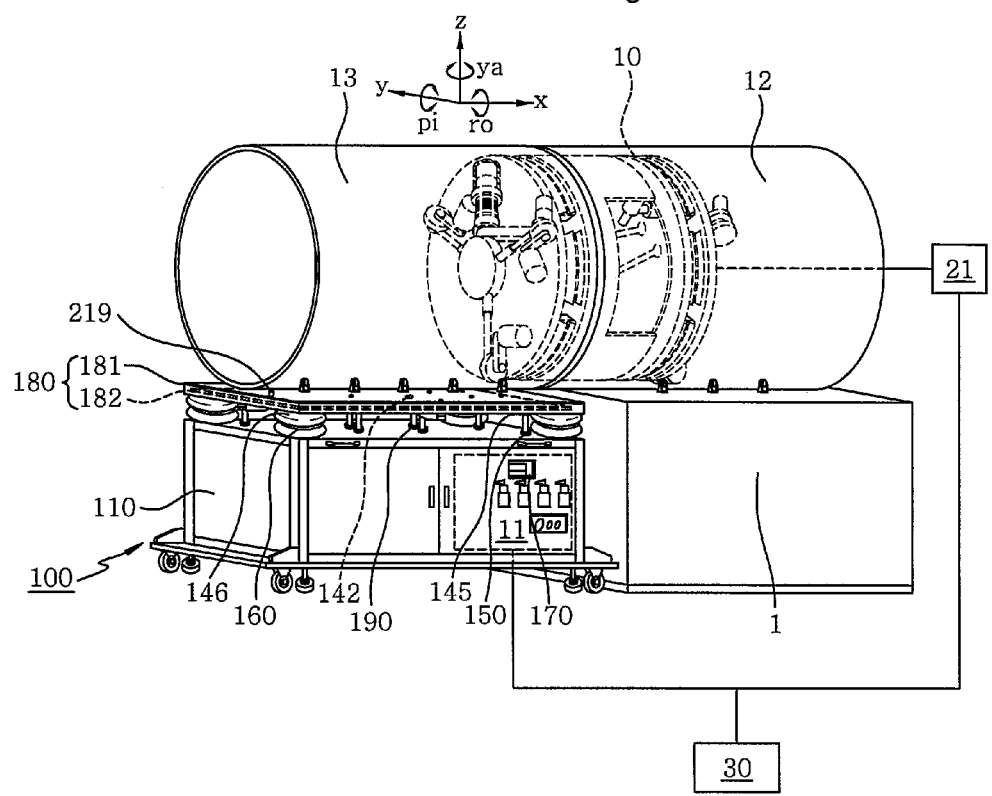
FIG. 6 is an arrangement state diagram of an automatic pipe aligning device and the weight balancer shown in FIG. 2.

As shown in FIG. 6, the first pipe 12 is transported by a carrier and the like to be placed on the surface plate 11, power is supplied to the weight balancer 100, and the operational pressure is supplied from the external operation source to be in the alignment standby state in which the leveling and the weight balancing can be performed. As described above, due to the upper plate 181, the lower plate 182, the slide contact portion, the combination relation between the lower plate 182 and the ball pivot of the guide portion 190, the structural relation in which the lower plate 182 and the load cell 145, 146 are not fixed, and the like, the operation plate 180 includes a passive movement within a finite or pre-designed range to include the 6 degrees of freedom (X, Y, Z, ro, pi, ya) on the basis of the body frame 110 put on the ground.

The passive movement of the operation plate 180 is defined as being that the operation plate is made to move by the operation force of the level cylinder 150 and the balancing device 160, or a manual force provided by, for example, an operator, or the operation plate moves within the finite range by receiving the operation force required for the automatic pipe alignment robot.

The height of the surface plate 11 and the height of the operation plate 180 of the weight balancer 100 are made to be in accord beforehand, and the target value mentioned in the present invention is a height where the height of the surface plate 11 is in accord with the operation plate 180 or can be preset on the basis of the height where the first pipe 12 on the surface plate 11 is in accord with the second pipe 13 on the operation plate 180, and the measure is not limited to the weight balancer 100.

When the second pipe 13 is transported and loaded by a carrier and the like, the operation plate 180 goes down or is inclined by the weight of the second pipe 13 or a weight imbalance, and at this moment, the proper weight of the second pipe 13 is detected in the load cells 145, 146 through the operation plate 180.

Then, the automatic pipe aligning device 10 is inputted inside the first pipe 12, and then, a dynamic load is detected in the load cells 145, 146 when the automatic pipe aligning device 10 is made to move to the second pipe 13.

Further, if the automatic pipe aligning device 10 is fully mounted on the first and second pipes 12, 13 and an aligning function starts for the stepped difference correction and the root gap of the first and second pipes 12, 13, the weight balancer 100 reduces the translational motion and rotation caused by the static or dynamic load so that the first and second pipes 12, 13 can be arranged easily, and the height of the surface plate 11 and the height of the operation plate 180 are made to be fixed to help the movement of the second pipe 13.

For example, the weight balancer 100 inputs the static or dynamic load detected from the load cells 145, 146 and the inclination information of the second pipe 13 or the operation plate 180 detected in the tilt sensor 142 to the controller.

The leveling and balancing operation process module of the controller, as described above, generates a cylinder control signal such as a stroke control signal for reducing or removing a complicated movement and the load of the upper plate 181 and the second pipe 13 put thereon, by employing each of the detection signals of the load cell 145, 146 and the tilt sensor 142. Then, the leveling and balancing operation process module of the controller transmits the generated signal to the operation force driver 130.

Herein, the cylinder control signal is for adjusting a forward operation amount, e.g., axial length extension amount, or a backward operation amount, e.g., axial length reduction amount, of the operational axis of the leveling cylinder 150 and the balancing device 160. The cylinder control signal is obtained or calculated by a general software algorithm used in a general automatic regulator, or a damping or horizontal control system to be converted into an electrical signal.

The operation force driver performs the open and close of the solenoid valve and the operational pressure increase or decrease control correspondingly to the transmitted cylinder control signal. In the end, the operation force driver control the extension or reduction length of the operational axis of the leveling cylinder 150 and the balancing device 160, and as a result, it reduces the static or dynamic load, the inclination and the vibration transmitted through the operation plate 180, thereby helping the first pipe 12 and the second pipe 13 to be consistently arranged.

That is, the plurality of leveling cylinders 150 controls the height, location and direction of the operation plate 180 to reduce the load or to make the height of the second pipe 13 fixed. For example, the operational pressure is applied relatively more to the leveling cylinder 150 of one side where the load is greater than the target value which is pre-recorded and stored, thereby making the level of one side of the leveling cylinders in accordance with that of the other side of the leveling cylinders. In addition thereto, the plurality of balancing devices 160 acts to balance the pipe by minutely adjusting the height, location, direction, inclination and vibration of the operation plate 180, i.e., prevents the inclination and vibration of the second pipe 13. For example, the air pressure is increased or decreased correspondingly to each of the general tilt angle adjustment algorithm and the damping prevention algorithm on the basis of the balancing device 160 of one side or the other side of a place where the inclination and vibration is different from the pre-recorded and stored target value, thus the translational motion and rotation of the operation plate 180 is attenuated.

The display unit 170 acts to display various measures sensed from the load cells 145, 146 or the tilt sensor 142. Of course, the display unit 170 can display or output the measure, which is operationally processed by the controller, in regard to the leveling and balancing of the second pipe 13 as the measure detected from the load cells 145, 146 is inputted to the controller.

The weight balancer of the present invention as described above reduces the load generated when aligning the pipes and accurately adjusts the height and location of the pipes or prevents the vibration and inclination by means of the balancing device and the leveling cylinder having a plurality of load cells when performing the operation of aligning or welding the pipes of heavy weight.

Further, the weight balancer of the present invention can attach or detach a plurality of roller jigs to the operation plate and arrange the roller jigs in the operation plate so that the pertinent pipe can be supported while accommodating the shape of the pertinent pipe, thus the weight balancer can be used in the arrangement operation of the pipes of various shapes as well as the pipes of a specific shape.

Further, the weight balancer according to the present invention uses the operation plate, which is of a double plate type and includes 6 degrees of freedom to be able to minutely move within a finite range, as a pipe supporting jig so that the upper plate of the operation plate and the second pipe can move within the pre-designed range. Thus, it is possible to remove the inconvenience of moving the whole body frame while performing the weight balancing and leveling, and there is a structural characteristic of being easy to arrange the pipes because the upper plate of the operation plate can be fully linked with the pipe alignment.

Accordingly, the weight balancer according to the present invention can improve the height and location precision of the pipe, and can improve weld quality additionally.

(Pipe Joining Method)

Hereinafter, a pipe joining method which cooperatively controls a weight balancer and an automatic pipe aligning device will be described in detail with reference to the accompanying drawings.

Figure 7:
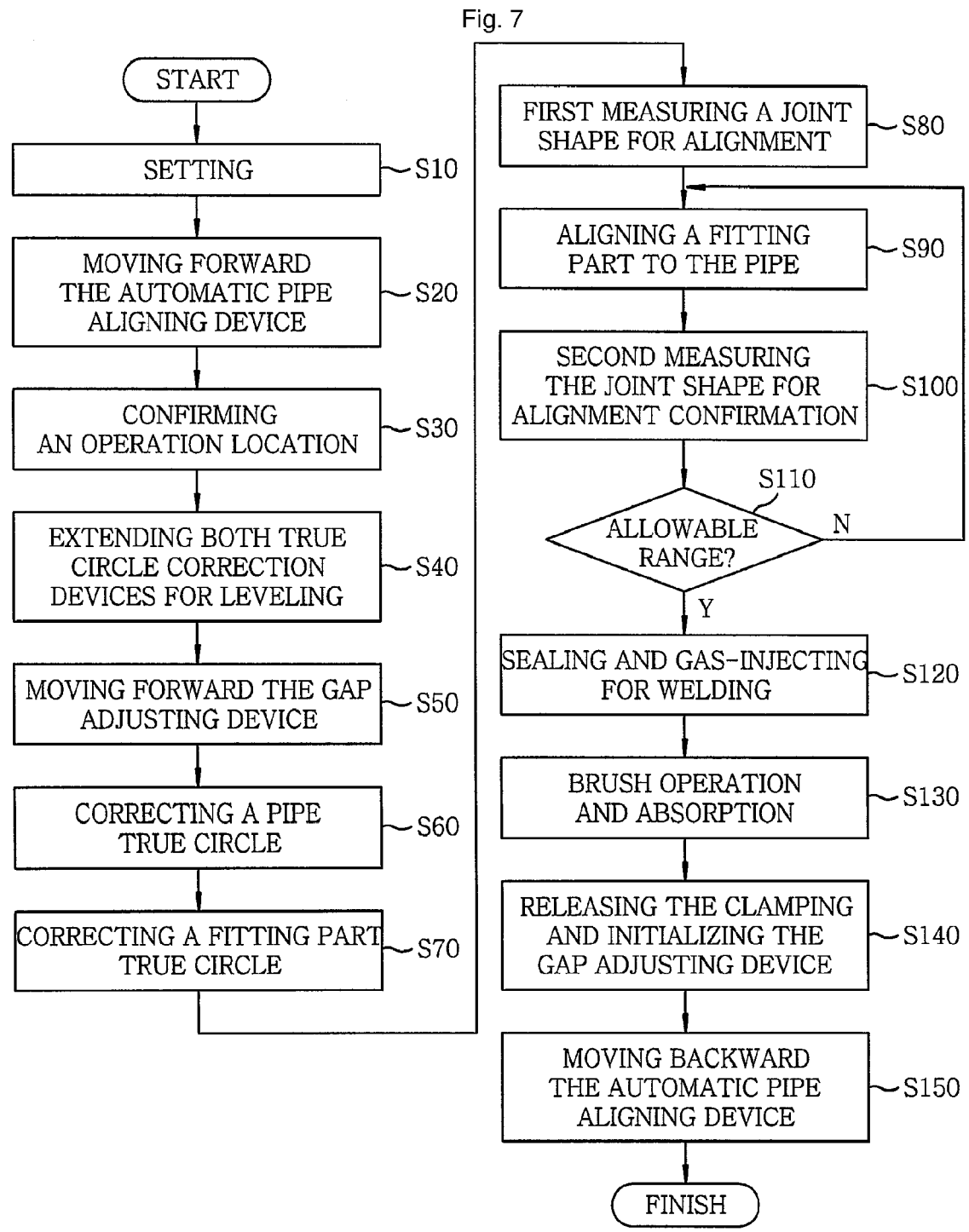
FIG. 7 is a block diagram for explaining a pipe joining method according to the present invention.
Figure 8A:
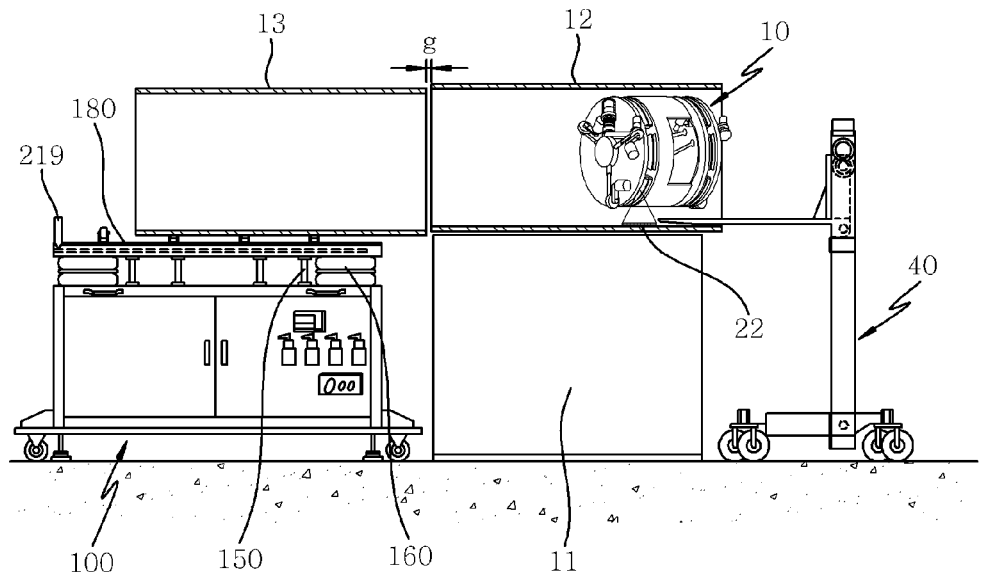
FIGS. 8A to 8N are operational state diagrams for each of the steps of the pipe joining method according to the present invention.
Figure 8B:
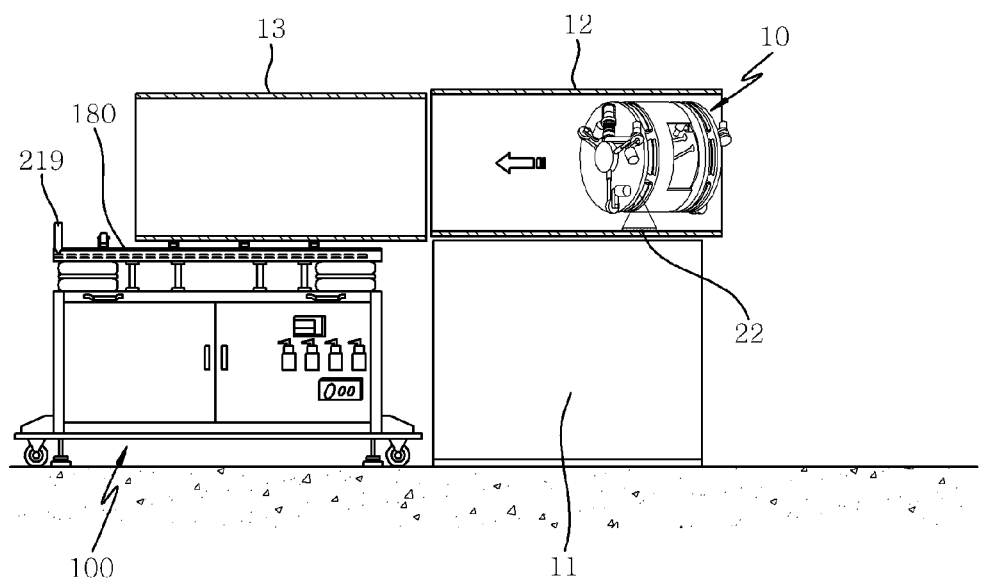
Figure 8C:
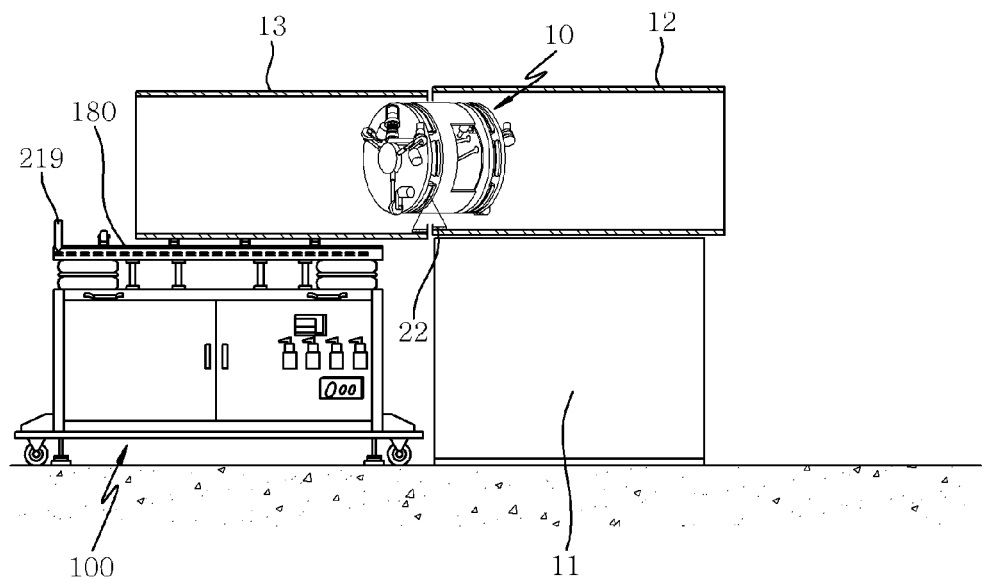
Figure 8D:
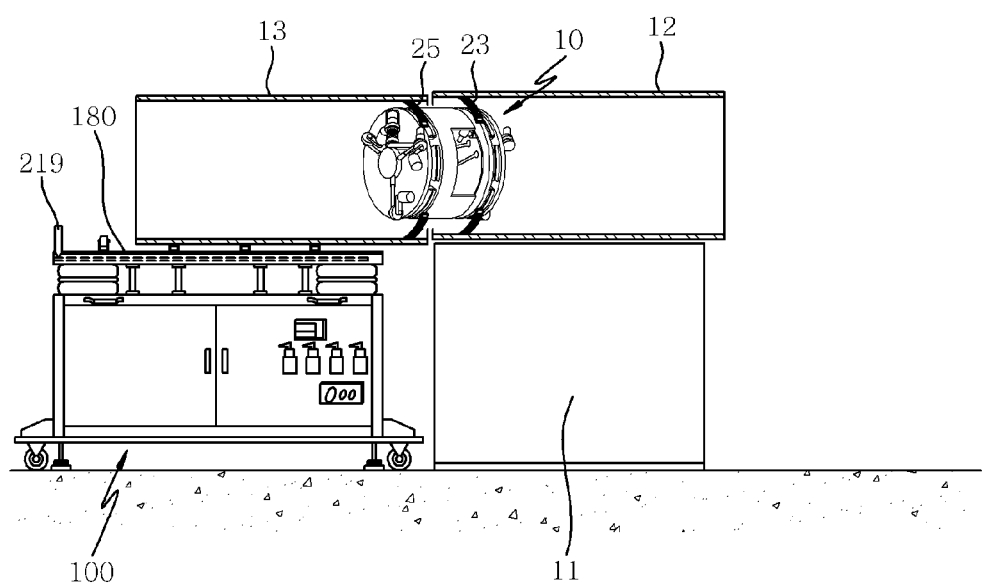
Figure 8E:
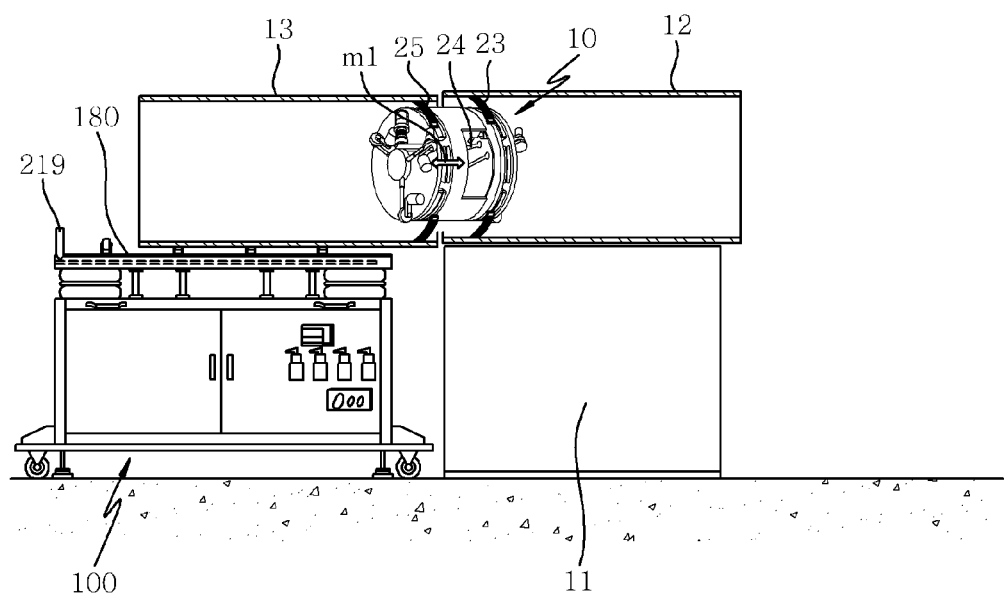
Figure 8F:
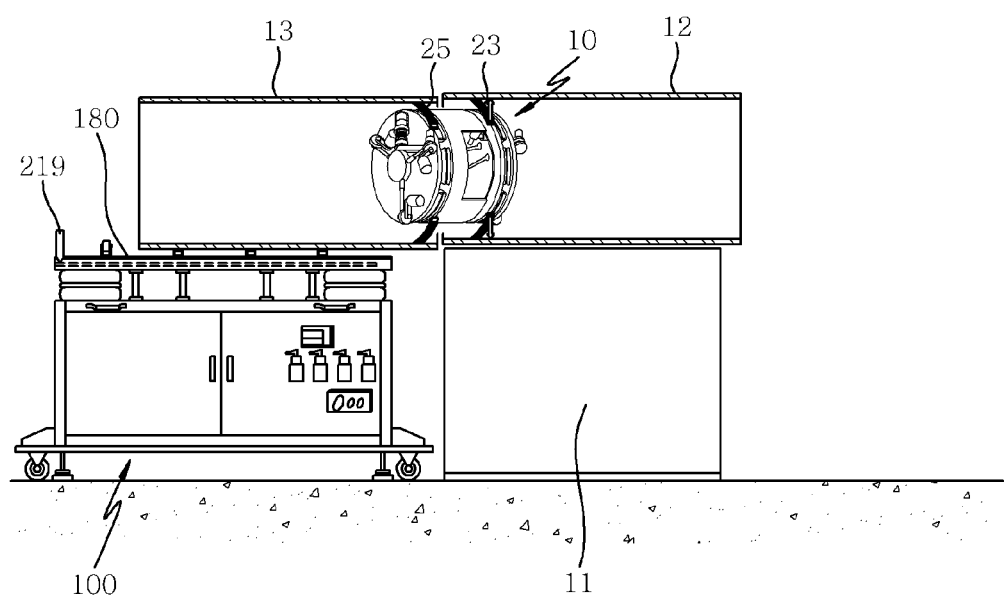
Figure 8G:
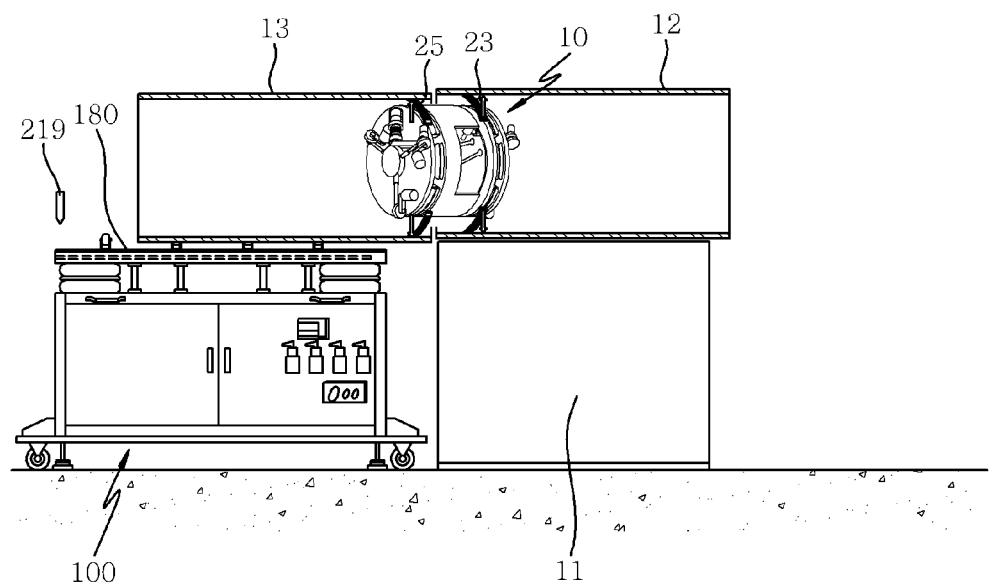
Figure 8H:
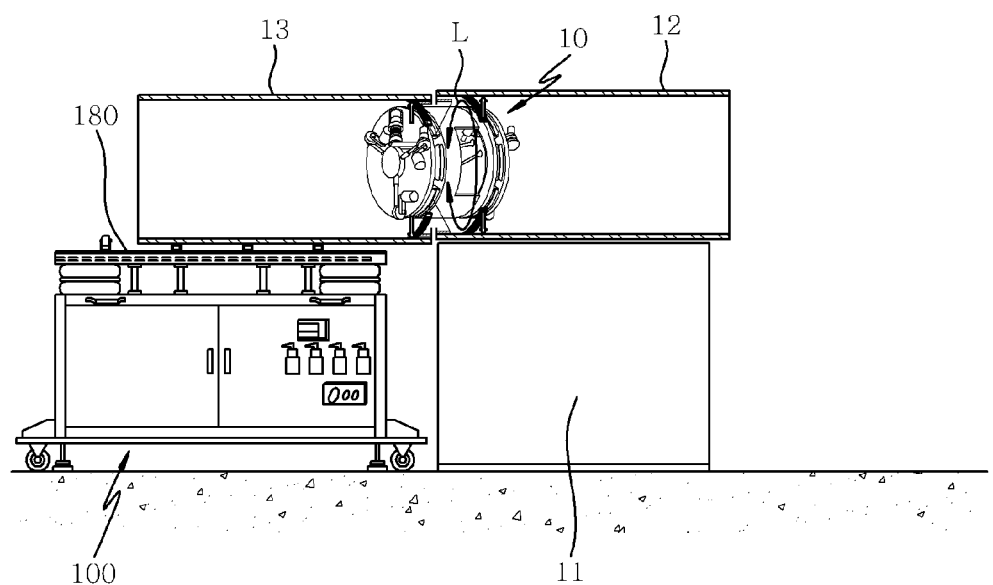
Figure 8I:
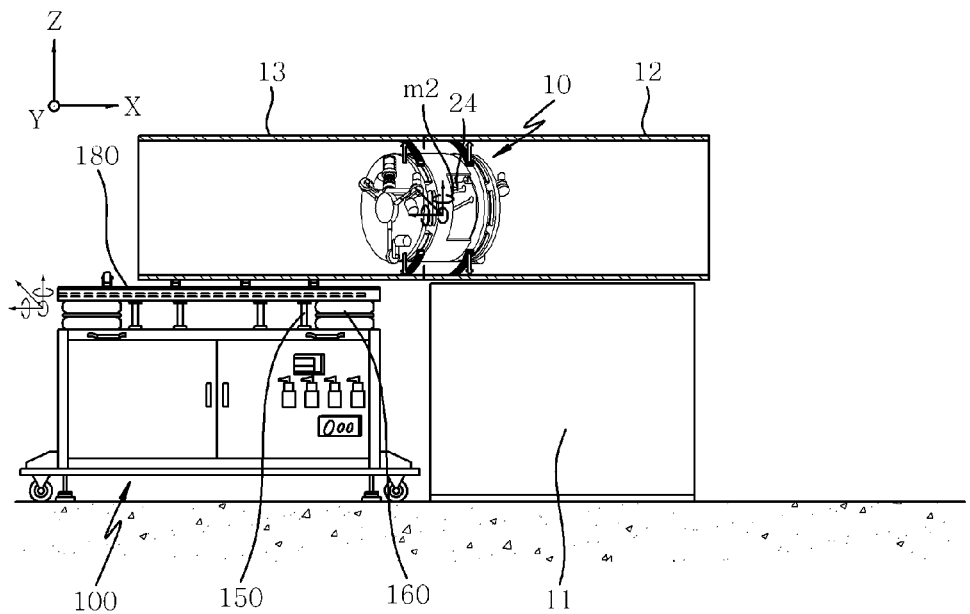
Figure 8J:
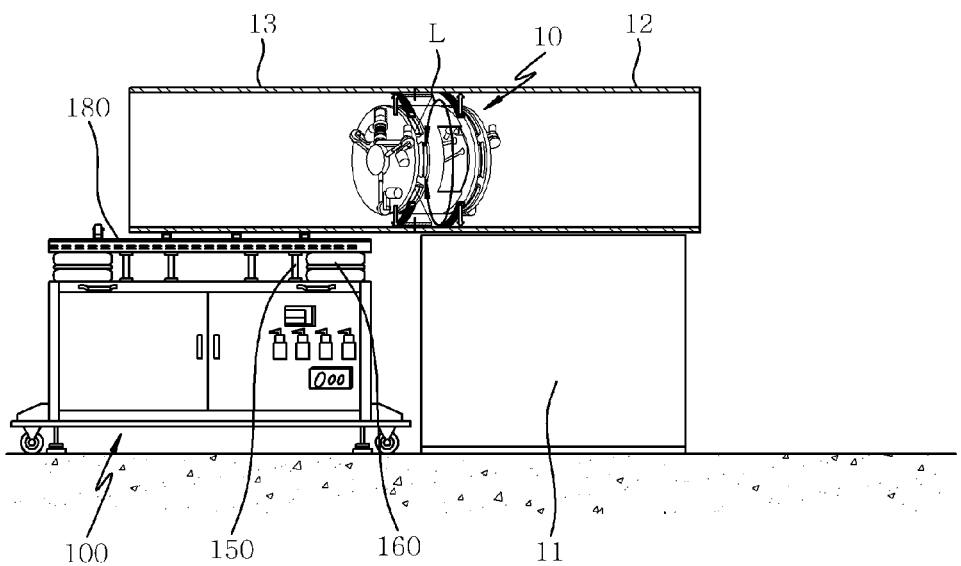
Figure 8K:
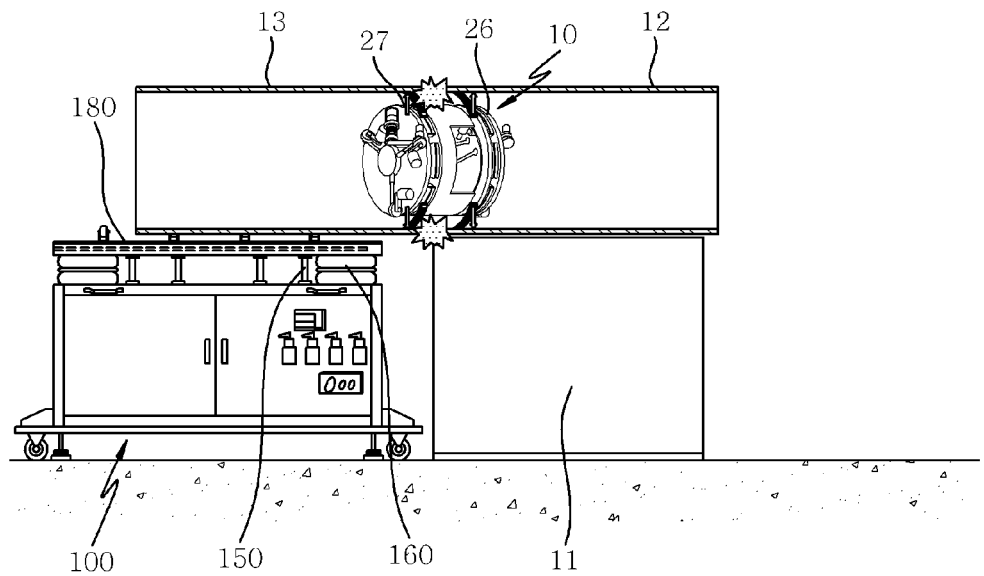
Figure 8L:
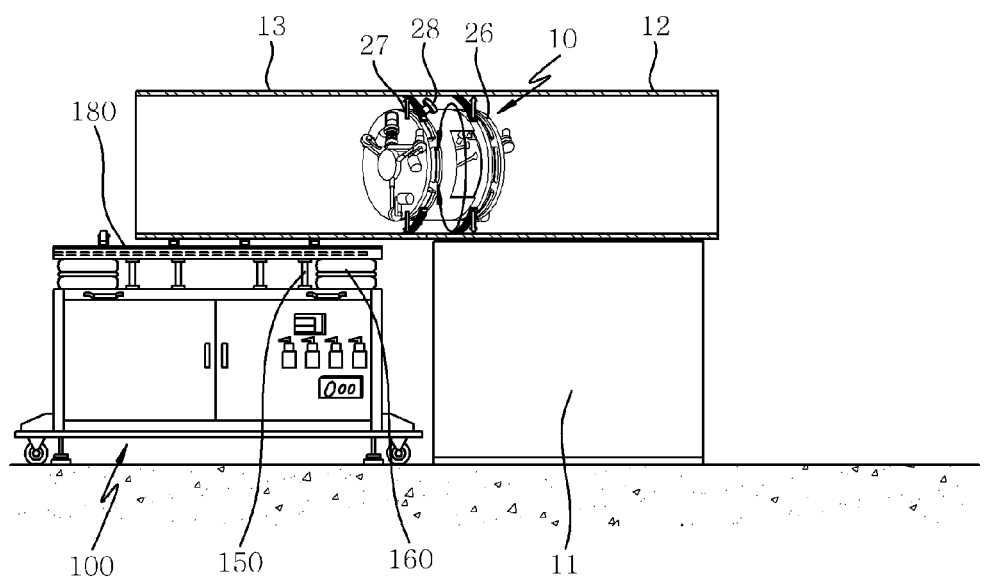
Figure 8M:
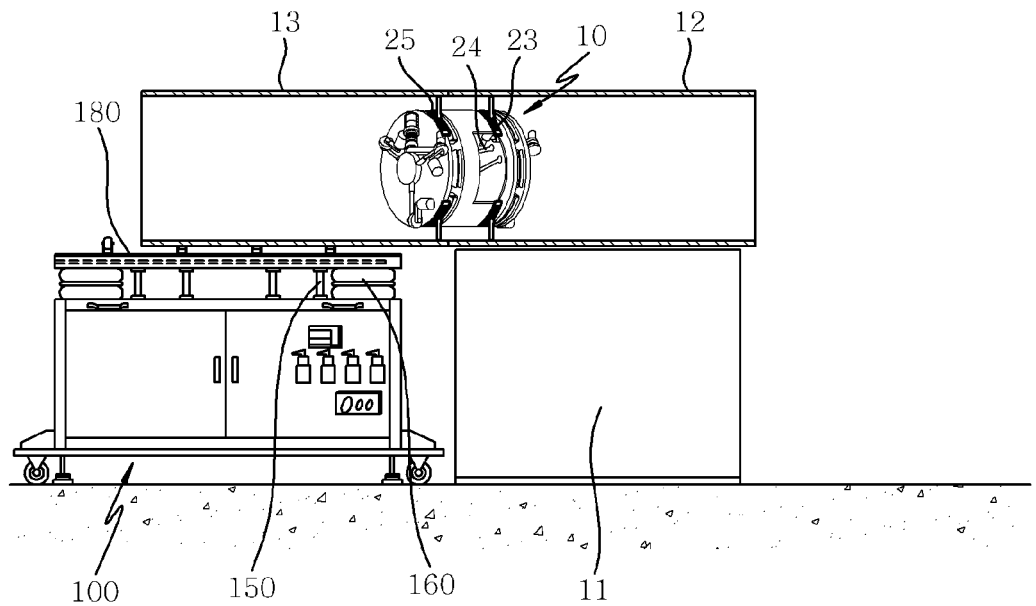
Figure 8N:
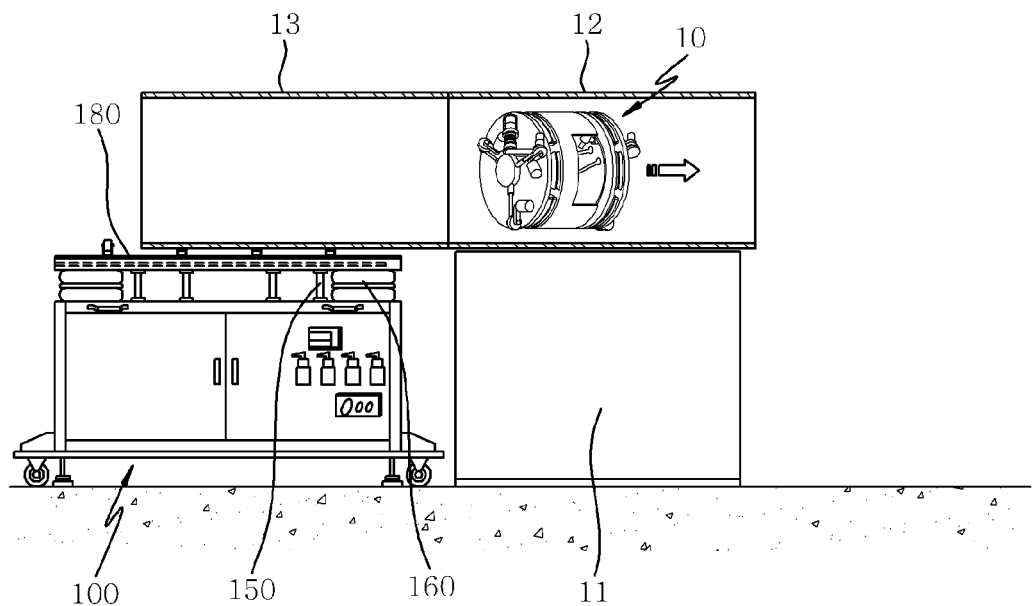

FIG. 7 is a block diagram for explaining a pipe joining method, and FIGS. 8A to 8N are operational state diagrams for each of the steps of the pipe joining method.

Firstly, as shown in FIG. 6, the pipe joining method according to the present invention can include a weight balancer 100; an automatic pipe aligning device 10; an integral controller 30 for performing an integral control in order to link them; and other device configuration.

Among the device configuration required in this invention, a surface plate 11 is desirable to include a height corresponding to the weight balancer 100, but to be a standard surface plate which satisfies the international standard.

A first pipe 12 refers to one pipe or an equivalent thereto, e.g., various sizes of pipe members or connection pipes, put on the surface plate 11.

A second pipe 13 forms a joint portion together with the first pipe 12, and is referred to as being another pipe or an equivalent thereto, e.g., T-pipe, elbow, extension pipe, reduction pipe and the like, which is arranged and aligned to correspond to the first pipe 12.

As described above, the weight balancer 100 includes a plurality of load cells; a tilt sensor; a leveling cylinder; a balancing cylinder; a controller 120; an operation force driver; an operation plate 180 of a double plate type; and the like so as to include functions such as reducing a load of a pipe, supporting 6 degrees of freedom, translational motion, rotation and minute adjustment. The operation plate 180 includes an upper plate; a lower plate; an edge beam; and a fixing pin 219 for fixing the upper plate to the lower plate.

In fact, the second pipe 13 is put on the upper plate of the operation plate 180. If the fixing pin 219 is removed, the upper plate can freely move through a plurality of slide contact portion located in the lower plate. The lower plate is supported by a balancing device 160 and a leveling cylinder 150 of the weight balancer 100. Correspondingly to the combination or removal of the fixing pin 219, the fixing pin 219 acts to keep the upper plate in a fixed state or in a free state where it can move freely, on the basis of the lower plate.

The automatic pipe aligning device 10 is a hardware unit which can substantially realize the pipe joining method described in detail later, and can be the automatic pipe aligning device disclosed in Korea Patent No. 639607. Because of this, a description on the automatic pipe aligning device 10 is made clearly and in detail in the Patent Reference related thereto, thus contents except absolutely necessary contents will be omitted for the sake of simplicity.

For example, the automatic pipe aligning device 10 includes a plurality of clamping and true circle correcting devices; a plurality of airtight devices; a drive device; a guide device; a gap adjusting device like 6 axis parallel robot; an inspection device; a grinder device; a protection device; a controller 21; and the like.

The integral controller 30 can be mounted on a separate control box or can be made as an integrated circuit device in any one of the controller 120 of the weight balancer 100 or the controller 21 of the automatic pipe aligning device 10.

The integral controller 30 is connected to the controller 120 of the weight balancer 100 and the controller 21 of the automatic pipe aligning device 10, and performs the role of a mediator which transmits the integral control signals thereof, e.g., operational information of the automatic pipe aligning device and the like, to each other. To this extent, the integral controller 30 includes a circuit power supply module; a communication module; an input and output module; and an integral motion control module.

As shown in FIG. 7, the pipe joining method according to the present invention can be realized by the aforementioned device configuration.

The pipe joining method according to the present invention includes a first step of setting (S10); a second step of moving the automatic pipe aligning device forward (S20); a third step of confirming an operation location (S30); a fourth step of extending both true circle correction devices for leveling (S40); a fifth step of moving the gap adjusting device forward (S50); a sixth step of correcting a pipe true circle (S60); a seventh step of correcting a fitting portion true circle (S70); an eighth step of first measuring a joint shape for alignment (S80); a ninth step of aligning a fitting portion to the pipe (S90); a tenth step of second measuring the joint shape for alignment confirmation (S100); an eleventh step of checking by comparing the result value by the second measurement with the preset tolerance (S110); a twelfth step of sealing and gas-injecting for welding (S120); a thirteenth of brush operation and absorption (S130); a fourteenth step of releasing the clamping and initializing the gap adjusting device (S140); and a fifteenth step of moving backward the automatic pipe aligning device (S150).

Setting—First Step (S10)

As described in FIG. 8A, basically, an operator prepares for an operation.

The operator put the first pipe 12 on the surface plate 11. The operator put the second pipe 13 corresponding to another pipe which is to be aligned to the first pipe 12, on the weight balancer 100. Herein, the weight balancer 100 is arranged in series on the basis of the surface plate 11 on the operation site ground so as to be in accord with the first pipe 12 on an imaginary line. And, the first pipe 12 and the second pipe 13 are brought into contact with each other with a tolerance gap (g) therebetween by the operator. The weight balancer 100, as mentioned above, includes the operation plate 180 corresponding to a jig of a double plate type. The fixing pin 219 keeps the upper plate in the fixed state on the basis of the lower plate of the weight balancer 100.

In such a state, the weight balancer 100 receives a feedback of a load and inclination information sensed in the weight balancer 100 and receives an operational information of the automatic pipe aligning device 10 transmitted through the integral controller, and then uses those information as conditional values necessary for calculating operational control values of the balancing device 160 and the leveling cylinder 150 of the weight balancer 100. And, the weight balancer 100 is linked to the automatic pipe aligning device 10. As a result of calculation, the static or dynamic load, inclination, vibration, weight or weight imbalance of the second pipe 13 transmitted through the operation plate 180 are reduced, thereby performing a balancer operation, hereinafter referred to as 'balancer operation', which helps the arrangement or alignment between the second pipe 13 and the first pipe 12.

The balancer operation of the weight balancer 100 can be performed in conjunction with the automatic pipe aligning device 10 for each operational step thereof.

On the other hand, the operator inserts the automatic pipe aligning device 10 into the first pipe 12 in use of a work cart 40.

After then, the operator turns on each system of the integral controller, the weight balancer 100 and the automatic pipe aligning device 10.

In this case, the automatic pipe aligning device 10 starts its initialization operation, and then, a laser beam 22 is emitted from an LVS (Laser Vision System) of the inspection device mounted in the automatic pipe aligning device 10.

Herein, the emitted laser beam 22 is desirable to be projected passing through an overlapping portion of the first pipe 12 and the one-arm holder portion of the work cart 40.

Moving the Automatic Pipe Aligning Device Forward—Second Step (S20)

As shown in FIG. 8B, the automatic pipe aligning device 10 inserted into the first pipe 12 includes a guide device located at the front portion of the automatic pipe aligning device 10; and a drive device located at the rear portion of the automatic pipe aligning device 10.

The automatic pipe aligning device 10 operates the wheels of the drive device and the guide device to be closely adhered to the inner circumference surface of the first pipe 12 by a drive algorithm pre-programmed in the controller thereof. Then, a drive force is transmitted to the wheel. In this case, the automatic pipe aligning device 10 starts a self-driving to a connection portion between the first pipe 12 and the second pipe 13.

The automatic pipe aligning device 10 image-detects the emitted laser beam 22 during the course of driving. The driving continues until the center of the laser beam 22 corresponding to the center between the clamping and true circle correcting devices located at both ends of the automatic pipe aligning device 10 is positioned at the connection portion of the first pipe 12 and the second pipe 13.

At this moment, in the weight balancer 100, the upper plate fixing pin 219 keeps the upper plate and the second pipe 13 thereon in a fixed state.

Confirming the Operation Location—Third Step (S30)

As shown in FIG. 8C, the automatic pipe aligning device performs an operation location confirmation, i.e., it stops after sensing the operation location in use of the laser beam after moving forward, i.e., driving. To describe at length, the drive of the automatic pipe aligning device 10 stops when the drive device stops as an operation stoppage condition is that the center of the emitted laser beam 22 is located at the connection portion of the first pipe 12 and the second pipe 13. Herein, the operation stoppage condition can be set in consideration of a brush location of a grinder device described below.

At this moment, the front portion of the automatic pipe aligning device 10 is located within the second pipe 13 and the rear portion of the automatic pipe aligning device 10 is located within the first pipe 12.

Extending Both True Circle Correcting Devices for Leveling—Fourth Step (S40)

As shown in FIG. 8D, the automatic pipe aligning device 10 moves a plurality of internal pressure members 23 of a rear clamping and true circle correcting device thereof to the inner circumference surface of the first pipe 12 to be extended as much as a partial stroke distance, and at the same time, moves a plurality of internal pressure members 25 of a front clamping and true circle correcting device thereof to the inner circumference surface of the second pipe 13 to be extended as much as a partial stroke distance, so that the automatic pipe aligning device 10 maintains to be level.

Moving the Gap Adjusting Device Forward—Fifth Step (S50)

As shown in FIG. 8E, the automatic pipe aligning device 10 operates the six axis parallel robot of the gap adjusting device 24 to dispose the internal pressure members 25 of the front clamping and true circle correcting device inside the second pipe 13 in order to correct the true circle of the second pipe 13 in a relatively stable location.

At this moment, the internal pressure member 25 is not in a full clamping state, thus the internal pressure member 25 can slide along the inner circumference surface of the second pipe 13. In this state, the internal pressure member 25 is moved forward correspondingly to the operation of the six axis parallel robot of the gap adjusting device 24.

Correcting the True Circle of the Pipe—Sixth Step (S60)

As shown in FIG. 8F, the automatic pipe aligning device 10 controls the force of further moving the plurality of internal pressure members 23 of the rear clamping and true circle correcting device thereof toward the inner circumference surface of the first pipe 12, thus the internal pressure member 23 is fully clamped to the inner circumference surface of the first pipe 12 and the true circle of the first pipe 12 is formed.

Correcting the True Circle of the Second Pipe—Seventh Step (S70)

As shown in FIG. 8G, the fixing pin 219 is removed in this step, thus the upper plate of the operation plate 180 becomes free to move on the basis of the lower plate.

In this case, the automatic pipe aligning device 10 controls the force of further moving the plurality of internal pressure members 25 of the front clamping and true circle correcting device thereof toward the inner circumference surface of the second pipe 13, thus the internal pressure member 25 is fully clamped to the inner circumference surface of the second pipe 13 and the true circle of the second pipe 13 is formed.

While forming the true circle of the second pipe 13, the dynamic load or weight imbalance given to the second pipe 13 is reduced by the balancer operation of the weight balancer 100 which is in conjunction with the automatic pipe aligning device 10, thus it is possible to form the true circle of the second pipe 13 more precisely.

First Measuring a Joint Shape for Alignment—Eighth Step (S80)

As shown in FIG. 8H, the LVS (L) of the inspection device mounted in the automatic pipe aligning device 10 rotates 360° along the inner circumference surface of the joint, thereby first measuring the gap and stepped difference between the first pipe 12 and the second pipe 13.

After then, the controller of the automatic pipe aligning device 10 does a circle fitting for the end sections of the first pipe 12 and the second pipe 13 which face each other in use of the first measured value, and calculates the coordinate system of the center of the end section circle to generate a goal pose.

Further, the controller of the automatic pipe aligning device 10 transmits an operation order value for the determined goal pose to a motion controller for the gap adjusting device of the automatic pipe aligning device 10.

Aligning the Second Pipe to the First Pipe—Ninth Step (S90)

As shown in FIG. 8I, the motion controller for the gap adjusting device 24 of the automatic pipe aligning device 10 transmits a 6 degrees of freedom motion value for the goal pose to each of linear actuators of the 6 axis parallel robot of the gap adjusting device 24 in use of the transmitted operation order value, thereby performing a detail alignment step for aligning the gap and stepped difference between the first pipe 12 and the second pipe 13 in a state that weld can be done (m2).

Herein, the detail alignment step is desirable to be made in the order below so as not to generate a malfunction caused by a cross-interference between the first pipe 12 and the second pipe 13.

That is, the detail alignment step includes (a) moving the second pipe 13 in an X-axis direction to be separated from the first pipe 12, (b) rotating the second pipe 13 to correspond to a rotation component value for being converted into the goal pose, (c) moving the second pipe 13 to correspond to Z-axis and Y-axis direction movement values for the goal pose, and (d) adjusting the offset in the X-axis direction finally.

At this moment, the weight balancer 100 performs the balancer operation as in the leveling cylinder 150 and the balancing device 14 so that the weight or weight imbalance of the second pipe 13 can be reduced to the extent that the automatic pipe aligning device 10 can move the pipe.

Second Measuring a Joint Shape for Alignment Confirmation—Tenth Step (S100)

As shown in FIG. 8J, the LVS (L) of the inspection device mounted in the automatic pipe aligning device 10 rotates 360° along the inner circumference surface of the joint, thereby second measuring the gap and stepped difference between the first pipe 12 and the second pipe 13. And the result value of the second measurement is transmitted to the controller of the automatic pipe aligning device 10.

Checking a Tolerance—Eleventh Step (S110)

The controller of the automatic pipe compares the second measured result value with the tolerance for the preset gap and stepped difference of the whole circumference of the cross sections of the aligned first and second pipes 12, 13 to check the comparison result.

If the second measured result value is included in the tolerance, the twelfth step (S120) described below is performed.

On the contrary, if the second measured result value is not included in the tolerance, similarly to the eighth step (S80), the circle fitting of the end sections of the first pipe 12 and the second pipe 13 which face each other is carried out again in use of the second measured result value. And, as a result thereof, the center coordinate system of the end section circle is re-calculated, a second goal pose is generated, and then the ninth step (S90) is performed.

Sealing and Gas-Injecting for Weld—Twelfth Step (S120)

As shown in FIG. 8K, the controller of the automatic pipe aligning device 10 extends a plurality of airtight devices 26, 27 to closely adhere to the inner circumference surface of the first pipe 12 and the inner circumference surface of the second pipe 13.

After then, the automatic pipe aligning device 10 performs a pursing process of injecting argon gas to a portion where welding is to be done. The pursed argon gas is kept therein by the airtight devices 26, 27, thus the gas usage amount can be remarkably reduced when compared with the prior art.

In such a state, the operator performs a tack weld that a plurality of tab pieces are temporarily stuck to the joint of the aligned first and second pipes 12, 13.

Further, a protection device of the automatic pipe aligning device 10 pertinent to a partial shielding film device performs a rotation operation so as to move as much as the progress range of the tack weld under control of the operator.

After then, while the operator removes the tab pieces used in the tack weld one by one, the operator performs a TIG weld across the whole joint thereof, and even at this moment, the protective device is also rotationally operated to correspond to the TIG weld.

Brush Operation and Absorption—Thirteenth Step (S130)

As shown in FIG. 8L, the controller of the automatic pipe aligning device 10 returns the plurality of airtight devices 26, 27 to the original positions.

After then, the automatic pipe aligning device 10 moves a grinder device 28 to the vicinity of the weld portion after starting the grinder device 28 thereof, and then, the grinder device 28 is self-operative to brush a back bead or oxide film formed when welding and absorbs the back bead and oxide film detached by such brushing to perform a cleaning operation.

Releasing the Clamping and Initializing the Gap Adjusting Device—Fourteenth Step (S140)

As shown in FIG. 8M, the controller of the automatic pipe aligning device 10 monitors the back bead portion with a video system which can rotate 360°, thus the operator can perform a visual inspection for the welded portion from the outside.

After then, the controller of the automatic pipe aligning device 10 releases the clamping by returning the internal pressure members 23, 24 of the true circle correction device to the original position, and performs the initialization by returning the 6 axis parallel robot of the gap adjusting device 24 to the initial state.

Moving the Automatic Pipe Aligning Device Backward—Fifteenth Step (S150)

Lastly, as shown in FIG. 8N, the automatic pipe aligning device 10 moves back to the original starting point to be restored by the operator.

While the invention has been shown and described with respect to the preferred embodiments, it will be understood by those skilled in the art that various changes and modification may be made without departing from the scope of the invention as defined in the following claims.

The invention claimed is:

1. A weight balancer; comprising:
an operation plate for putting an alignment object;
a plurality of load cells installed in the lower portion of the operation plate;
a controller which receives a detection signal generated from the load cell and analyses the information of the alignment object to generate a control signal;
an operation force driver which receives the control signal from the controller to control an operational pressure of each of a plurality of pressure supply lines; and
a plurality of leveling cylinders and balancing devices which are connected to the pressure supply lines to control a location or pose of the operation plate so as to correspond to a size of the operational pressure controlled by the operation force driver,
wherein the operation plate includes an upper plate and a lower plate between which a plurality of slide contact parts are arranged, and an upper surface of an edge beam is stuck to the bottom surface of the edge of the upper plate, wherein the upper plate is transitionally slidable with respect to the lower plate, and wherein a plurality of gap maintaining shafts attached in the edge beam are projected toward a side surface of the lower plate so that a distance between the side surface of the lower plate and the edge beam is maintained to be variable but to be greater than projected lengths of the gap maintaining shafts.

2. The weight balancer of claim 1, wherein the leveling cylinder and the balancing device are any one selected from an air spring of which the pressure can be adjusted, a linear motor being a linear transferring device of which the length can be adjusted, a hydraulic servo cylinder, a motor and a rack and pinion mechanism, and a ball screw.

3. The weight balancer of claim 1, wherein a tilt sensor connected to the controller to input inclination information is stuck to the operation plate.

4. The weight balancer of claim 1, wherein the leveling cylinder and the balancing device are each installed in a body frame, and a plurality of height adjustment shaft and a moving roller having a stopper unit are in the lower portion of the body frame.

5. The weight balancer of claim 1, further comprising:
a plurality of guide portions installed between the lower plate and the body frame,
wherein each of the guide portions includes:
a ball type pivot combined with the lower plate;
a guide shaft which is extended along an axial direction from a ball of the ball type pivot and is in an axial length relatively longer than a maximum stroke of the leveling cylinder and the balancing device; and
a guide bush installed at an upper plate of the body frame to be combined with the guide shaft by using a slide insertion method.

6. The weight balancer of claim 1, wherein the upper plate includes a plurality of groove type mounting holes to arrange a plurality of rover jigs which are detachable and support an alignment object, and the groove type mounting hole includes a disposition gap and orientation corresponding to each shape of pipe layouts including, at least, a straight pipe, an elbow pipe and a T-type pipe.

* * * * *